(12) United States Patent
Török et al.

(10) Patent No.: US 6,204,587 B1
(45) Date of Patent: Mar. 20, 2001

(54) SELF-STARTING ELECTRIC BRUSHLESS MOTOR HAVING PERMANENT MAGNET AND RELUCTANCE POLES

(75) Inventors: Vilmos Török, Carl Milles vä7, S-181 34 Lidingöo (SE); Walter Wissmach, Munich (DE); Roland Schaer, Grabs (CH)

(73) Assignee: Vilmos Török, Campione d'Italia (IT)

( * ) Notice: Subject to any disclaimer, the term of this patent is extended or adjusted under 35 U.S.C. 154(b) by 0 days.

(21) Appl. No.: 08/973,185

(22) PCT Filed: May 30, 1996

(86) PCT No.: PCT/SE96/00704

§ 371 Date: Nov. 26, 1997

§ 102(e) Date: Nov. 26, 1997

(87) PCT Pub. No.: WO96/38903

PCT Pub. Date: Dec. 5, 1996

(30) Foreign Application Priority Data

May 30, 1995 (SE) .................................................. 9501981
May 31, 1995 (DE) ............................................. 195 20 052
May 31, 1995 (DE) ............................................. 195 20 054

(51) Int. Cl.[7] .................................................. H02K 19/06
(52) U.S. Cl. .......................................... 310/181; 310/168
(58) Field of Search ................................. 310/181, 269, 310/166, 168, 77, 93, 103

(56) References Cited

U.S. PATENT DOCUMENTS

| 4,438,362 | * | 3/1984 | Brown | 310/152 |
|---|---|---|---|---|
| 4,748,362 | * | 5/1988 | Hedlund | 310/168 |
| 5,294,856 | * | 3/1994 | Horst | 310/181 |
| 5,548,173 | * | 8/1996 | Stephenson | 310/181 |
| 5,717,316 | * | 2/1998 | Kawai | 322/46 |
| 5,757,100 | * | 5/1998 | Burgbacher | 310/186 |

FOREIGN PATENT DOCUMENTS

| WO 90/02437 | 3/1990 | (WO) . |
|---|---|---|
| WO 92/12567 | 7/1992 | (WO) . |

OTHER PUBLICATIONS

Compter, JC, "Microprocessor–Controlled Single Phase Reluctance Motor", Switched Reluctance Motor Drives, 233–237, Oct. 1998.*

* cited by examiner

Primary Examiner—Karl Eizo Tamai
(74) Attorney, Agent, or Firm—Browdy and Neimark

(57) ABSTRACT

A self-starting brushless electric motor having a first motor part (stator) (11) with poles arranged in a row, the poles constituting ferromagnetic poles (13S) or permanent-magnet poles (14A), a second motor part (rotor) (12) with poles arranged in a row, the poles having ferromagnetic poles (16A) or permanent-magnet poles and being arranged opposite the row of poles on the first motor part (11), wherein the motor part with salient ferromagnetic poles or, if both motor parts have salient ferromagnetic poles, at least one of the motor parts has a permanent-magnet pole, and also a magnetizing winding on the first motor part. The system of poles formed by the pole rows is magnetically asymmetrical in the direction in which the motor parts (11, 12) are movable in relation to each other.

19 Claims, 11 Drawing Sheets

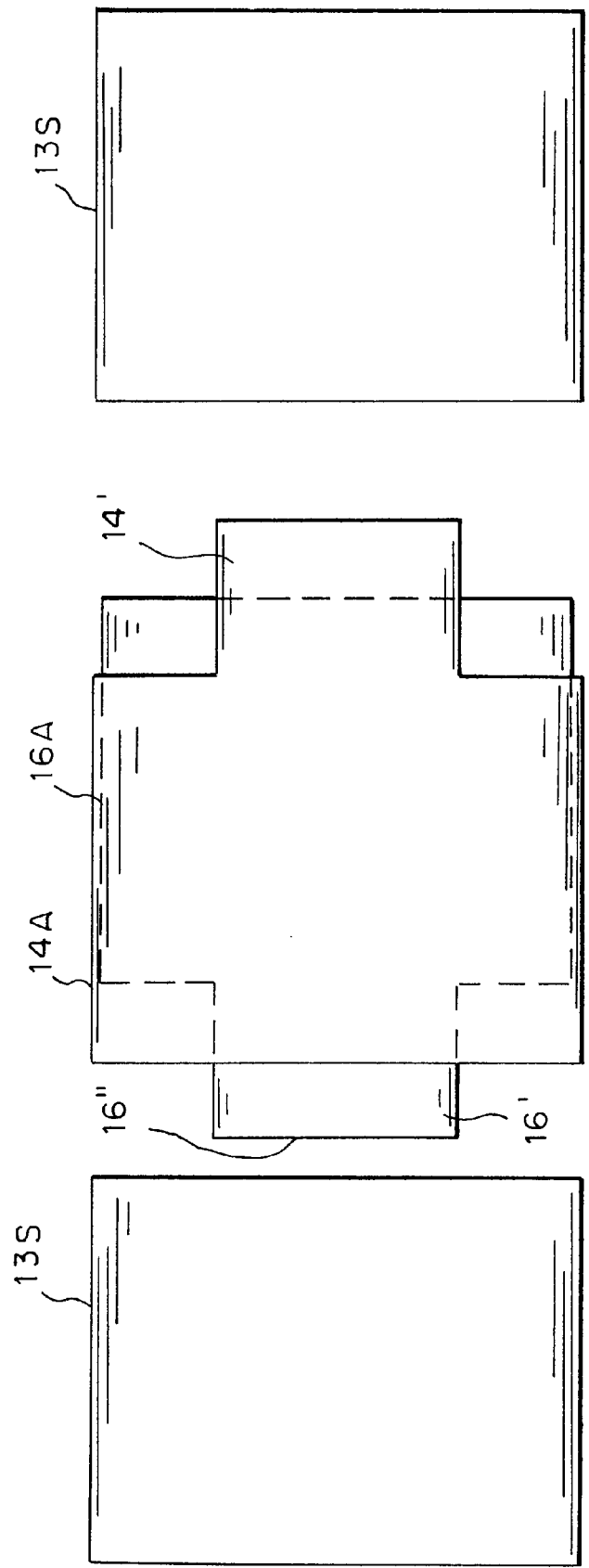

SELF-STARTING ELECTRIC BRUSHLESS MOTOR HAVING PERMANENT MAGNET AND RELUCTANCE POLES

This invention relates to a self-starting brushless electric motor of the type which comprises reluctance poles (ferromagnetic salient poles) at least on one of the two relatively moving motor parts and one or more permanent-magnet poles in the pole system.

Self-starting brushless electric motors can be supplied with direct current pulses of a single polarity or with alternating current polarity. When motors with moderate shaft power are supplied electronically, direct-current pulse supply uses the least number of electronic switches and thus gives the lowest system costs for motor and supply electronics. On the other hand, for higher power, when the number of electronic switches in the supply electronics in the motor must anyway be increased, it may be advantageous to supply the motor with alternating current polarity so that electric power will be supplied to the motor during both half-periods, thus achieving more uniform torque development and reducing the electrical conduction losses in the winding.

A single-strand brushless motor has only one winding supplied from a single external current source and provided on one of two or more parts which are rotatable or otherwise movable in relation to each other. Such a motor can be self-starting, i.e. develop a driving torque when at standstill in a predetermined direction, the preferential starting direction, only if this starting direction is inherent in the design of the motor. Self-starting in the preferential direction may be built into the motor by providing asymmetry in the soft-magnetic iron core, e.g. through the use of asymmetrical salient poles and/or asymmetrical permanent-magnet poles, or by providing auxiliary windings with no connection to external current sources, e.g. short-circuited current paths as in known shaded-pole motors. Such current paths can only conduct current under the influence of a varying magnetic field linked to these current paths. In order for current to flow in such current paths when the motor is stationary, the winding connected to an external current source must be supplied with a pulsed or alternating current.

It can be shown theoretically that motors that are not provided with auxiliary windings but are nevertheless able to exert torque in any rotor position even when the motor winding is deenergized must always contain a permanent-magnet pole.

In the following the description is limited to motors for rotary movement which have a first part, in the following called the stator, provided with a winding, and a second part, in the following called the rotor, arranged inside the stator and rotatable in relation thereto. It will, however, be appreciated that these two parts may exchange places, that the air gap separating the stator from the rotor need not be cylindrical but may equally well be flat or conical, and that the relative movement between the parts of the motor need not be rotary but may equally well be linear or a combination of rotary and linear, i.e. occur simultaneously about and along an axis of rotation.

The function of the motor may be described as comprising work cycles which are repeated a given number of times for each revolution. At extremely low speed, e.g. when starting up from standstill, the work cycle for a motor designed to be supplied with DC pulses of one polarity consists of one part when the winding carries current and another part when the winding is currentless. For a motor designed to be supplied with current pulses of alternating polarity the work cycle consists of one part when the winding is supplied with current of one polarity, followed by a currentless part and thereafter a part when the winding is supplied with current of opposite polarity followed by another currentless part of the work cycle.

In the currentless state the rotor must reach a starting position, i.e. a position in which the winding, if supplied with current, gives rise to a driving torque, namely a torque in the preferential direction of the motor, that is sufficiently high to overcome any frictional torque or the like in the motor and/or in the object driven by the motor. The torque generated in the motor through permanent-magnetic forces must maintain its direction and be of sufficient strength until the rotor reaches a position in which the winding can be energized. It will be understood that the demand for torque development in currentless state means that the motor must include at least one permanent-magnet pole.

Motors operating in accordance with the principles described and exhibiting magnetic asymmetry in the pole system are known through WO90/02437 and WO92/12567. An object of the present invention is to obtain improvements in motors of the type represented by the motors in the aforesaid publications.

This object is achieved by means of the arrangement of magnetically active stator and rotor elements (poles).

Besides the opportunity of realizing constructionally alternative embodiments, the invention also offers the opportunity of increasing the force generated by the motor—torque in a rotating motor and linearly acting force or "tractive force" in a linear motor—in one or more respects:

Increasing the torque generated by permanent-magnet poles that pulls the rotor of the currentless motor to the nearest starting position. Such improvement is advantageous in applications where high frictional torque may appear in the driven object, for example in shaft seals.

Increasing torque appearing in a motor whose rotor is stationary in a starting position and whose winding is supplied with the highest current available. Such improvement is also advantageous in the situations mentioned in the preceding paragraph.

Increasing, at least in certain embodiments, the air-gap power of the motor for given heat losses, thereby giving a smaller and economically more favourable motor for a given purpose, which may be a great advantage when low motor weight is of importance for certain types of applications, e.g. in hand-held tools or other hand-held objects, but is also an economic advantage in general, provided an unavoidable cost increase in the supply electronics does not cancel the effect.

The magnetically active elements in the motor of relevance to the invention are as follows:

Coils on the Stator

In principle the coils form a single current circuit and may be connected in series and/or in parallel. When the supply electronics consist of several units operating in parallel, these may be connected each to its own coil or group of coils, as if they formed a single electrical circuit. Instead of supplying the winding with alternating current polarity a two-part winding can be used, the two winding halves being supplied with a single current polarity, but the winding halves having magnetically opposite directions.

Ferromagnetic Salient Poles (Reluctance Poles)

In most of the motors shown according to the invention, ferromagnetic salient poles, in the following also called reluctance poles, are to be found on the stator, alone or together with permanent-magnet poles.

There may also be reluctance poles on the rotor, but preferably not mixed with permanent-magnet poles. A mixture of these pole types on the rotor can be contemplated but is normally not meaningful.

The reluctance poles on both stator and rotor may be magnetically asymmetrical. For magnetically asymmetrical stator poles the asymmetry should be directed in the opposite direction to the preferential direction of motion of the motor, whereas on the rotor the asymmetry should be in the same direction as the preferential direction of motion.

Alternatively or in addition, the reluctance poles on both stator and rotor may, however, show a certain magnetic asymmetry in the opposite direction to that described above without this making the motor inoperable.

Permanent-magnet Poles

Motors with only reluctance poles on the rotor must always be provided with a permanent-magnet pole on the stator. The permanent-magnet poles on the stator preferably are magnetically balanced, i.e. equal in number and size of both polarities.

In certain cases it is an advantage if the permanent-magnet poles are asymmetrical.

Motors with permanent-magnet rotor poles designed to be supplied with current pulses of a single polarity must always be provided with a permanent-magnet pole on the stator. If such permanent-magnet poles are asymmetrical in shape and have a main pole part and an auxiliary pole part, their main pole part may advantageously be displaced in the direction opposite to that of the auxiliary pole part, e.g. from a position it would have if the pole were symmetrical, consisting only of a main pole part.

Motors with permanent-magnet rotor poles may lack permanent-magnet poles on the stator. Such motors are self-starting only if they are supplied with current pulses of alternating polarity. Such motors will then have more uniform torque development and higher average torque for given winding losses than the motors supplied with current pulses of a single polarity.

The permanent-magnet poles, both symmetrical and asymmetrical, may skewed ends or edges, i.e. edges running at an angle to the direction of the rotor axis. In some cases such skewing of the edges of the permanent-magnet poles may be extremely beneficial to the function of the motor. Such skewed edges need not be embodied in geometric shapes. It is sufficient for the edges to consist of demarcation lines (demarcation zones) relating to the imprinted magnetic polarisation (in, for example, a permanent-magnet pole), i.e. they are imprinted when the permanent-magnet poles are magnetized.

These demarcation lines for zones with the same magnetic polarization may run other than linearly without the function of the motor being greatly affected.

The magnetic asymmetry can be achieved in several ways within the scope of the invention and the appended claims and some of them will be explained below.

As in the prior art motors, the magnetic asymmetry aims at building the preferential starting direction into the motor, but the magnetic asymmetry in motors according to the present invention also serves other purposes.

Basically, an additional purpose of the magnetic asymmetry as utilized in the present invention is to extend what is herein termed the pull-in distance. This is the distance over which a pole, a permanent-magnet pole or a magnetized reluctance pole, on one of the motor parts is capable of attracting a pole on the other motor part sufficiently to cause the two poles to be pulled towards one another from a first stable position, such as the indrawn position, to the next stable position, such as the starting position, in which they are mutually aligned magnetically and, accordingly, no magnetic pull force in the direction of relative movement exists between the poles (only a magnetic pull in a direction transverse to that direction).

During this pull-in motion the permeance between the two poles or, in other words, the magnetic flux passing between them (assuming that the magnetomotive force is constant) should increase steadily to a maximum value occurring when the poles are magnetically aligned. An extension of the pull-in distance thus calls for a lowering of the mean value of the rate of flux change over the pull-in distance.

Such a lowering can be accomplished by means of magnetic asymmetry, e.g. by providing on at least one of the poles an additional pole part extending in the relative preferential starting direction so that the pole will have a main pole part and an auxiliary pole part which determines the preferential starting direction.

In the starting position and the indrawn position, the auxiliary pole part extends at least to a point in the vicinity of the next pole (as seen in the relative preferential starting direction) on the other motor part and it may even slightly overlap that pole. However, an overlapping portion of the auxiliary pole part must not carry as much flux per unit length of overlap (measured circumferentially) as overlapping portions of main pole parts.

Assuming that in a rotary motor chosen by way of example both the leading ends and the trailing ends of both the stator poles and the rotor poles extend axially, magnetic asymmetry of a stator pole could in most cases in principle be observed in the following way. The rotor of the motor is replaced with a homogenous ferromagnetic cylinder of the same diameter as the rotor and the flux density in the air gap is measured along an axially extending line on the cylinder surface as the cylinder is rotated to move the line in the preferential direction of rotation past the pole. A graph showing the measured flux density (as averaged over the length of the line) versus the angular position of the line relative to the pole would rise, more or less steadily or in more or less distinct steps, from a point near zero at the leading end of the pole, to a roughly constant value under the main portion of the pole and then decline steeply at the trailing end. If the pole were magnetically symmetric instead, the graph would be symmetrical and resemble a Gaussian curve.

With suitable modifications the above-described principle is applicable also in other cases, such as when observing magnetic asymmetry of a rotor pole or a pole whose leading and trailing ends do not extend axially. For example, where the ends of the pole are skewed so that they extend along a helical line, the observation can be made with the measurement of the flux density taking place along a correspondingly skewed line.

In the case of permanent-magnet poles with uniform radial dimension and uniform radial magnetic polarization, magnetic pole asymmetry can result from the pole shape. For example, the leading and trailing ends of the pole may have different lengths in the axial direction of the motor. A similar effect can also be achieved by magnetically imprinting poles with a corresponding shape in a ring of permanent-magnetic material of uniform thickness. In this case the shape of the permanent-magnet ring has nothing to do with the magnetic pattern or "magnetic shape".

Magnetic pole asymmetry can also be achieved by providing a permanent-magnet pole with different radial dimensions at the leading and trailing ends, respectively, (i.e. by giving the air gap at the pole a width that varies in the direction of the relative movement of the motor parts) but giving it a uniformly strong magnetization over its entire volume.

Several methods can of course be used simultaneously in order to achieve magnetic asymmetry for the permanent-magnet poles.

There are also several ways of achieving magnetic asymmetry for salient ferromagnetic poles, the reluctance poles. One method is to arrange the surface of such a pole facing the air gap asymmetrically with regard to its extension in the axial direction of the motor, in which case the entire pole surface may be situated at the same radial distance from the axis of rotation.

Another method is to make the projection surface of the reluctance pole (the surface facing the air gap) symmetrical, but vary its radial distance from the axis of rotation, i.e. vary the width of the air gap along the pole surface, stepwise or continuously, in relation to an imagined (cylindrical) surface on the other motor part.

A third method is to vary the magnetic saturation flux density along the pole surface. This can be achieved by using different magnetic materials for different parts of the salient pole, or it can be achieved by varying the filling factor of the laminated ferromagnetic poles, or by means of punched recesses, for example, below the actual pole surface (so that the actual pole surface appears to be homogenous), or by varying the radial dimension of an auxiliary pole part such that it will have a shape resembling the profile of the curved beak of a bird.

Of course several methods of achieving magnetic asymmetry can be used simultaneously. The choice of how to achieve asymmetry is usually dependent on a balance between the manufacturing costs of the actual motor and the cost of the supply electronics, since the choice of the type of asymmetry may affect the size of the power electronic switch elements included in the supply electronics.

As will become apparent, in motors embodying the invention magnetic asymmetry may characterize not only an individual pole of a group of poles which are associated with a common winding coil such that all poles of the group are subjected to the magnetic field produced upon energization of the coil. It may also characterize the pole group and then not only by virtue of magnetic asymmetry of one or more individual poles but also by virtue of an asymmetrical positioning of an individual pole within a pole group or on the rotor.

A pole of a pole group on the stator is asymmetrically positioned if a rotor pole is moved through a distance longer or shorter than one-half rotor pole pitch when it is moved between a position in which it is magnetically aligned with that stator pole and the next adjacent position in which any pole on the rotor is magnetically aligned with a stator pole of a different pole type or, in the case of a stator having only permanent magnets, a pole of different polarity.

In other words, a permanent-magnet pole, for example, on the stator is asymmetrically positioned with respect to a reluctance pole in the same or a different pole group if a rotor pole traverses a distance which is longer or shorter than one-half rotor pole pitch when the rotor moves between a position in which a rotor pole is magnetically aligned with that permanent-magnet pole, i.e. is in the starting position, to the next following or next preceding position in which a rotor pole—which may be any rotor pole—is in an indrawn position.

In a corresponding manner, magnetic asymmetry resulting from asymmetric positioning of poles may also exist in the rotor. For example, in a pole row on a rotor comprising permanent-magnet poles of alternating polarity, the North-pole permanent-magnet poles may be displaced in either direction from a central position between the South-pole permanent-magnet poles with all like poles substantially equally spaced.

It should be noted in the context of the present invention a pole group (pole unit) may comprise a single pole or a plurality of poles associated with a magnetizing coil.

The invention will now be described in more detail with reference to a number of exemplifying embodiments shown schematically in the accompanying drawings.

FIG. 1A shows an end view of a first embodiment of a rotating motor. The stator thereof has two identical diametrically opposed pole groups, each consisting of two symmetrical reluctance poles and an asymmetrical permanent-magnet pole placed between them, provided with a magnetizing winding. The rotor, shown in fully indrawn rotary position, has four asymmetrical reluctance poles;

FIGS. 3A, 3B to 12A, 12B show further embodiments in the corresponding manner to FIGS. 1A and 1B.

Figure 1A:
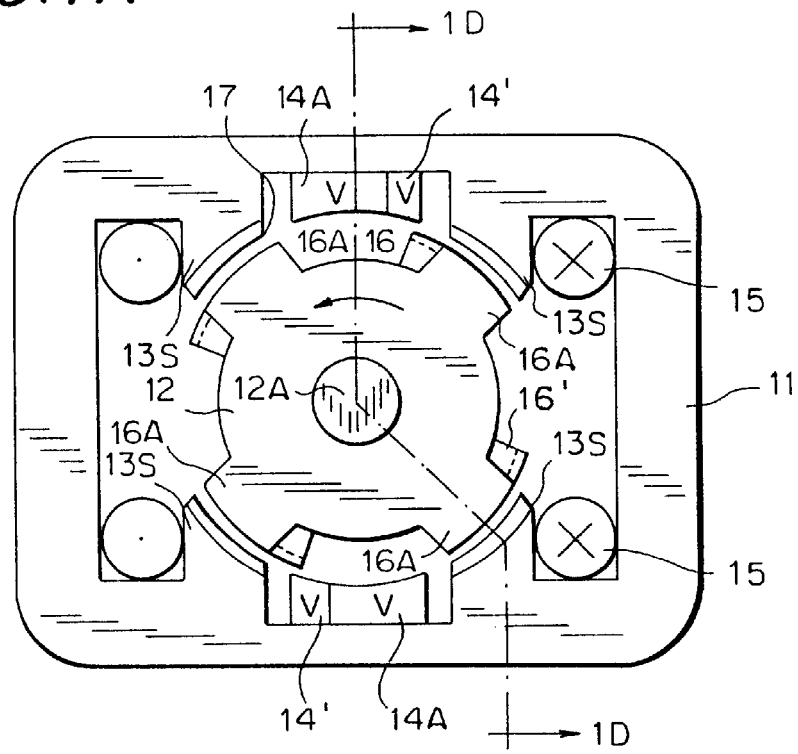
FIG. 1B is a developed view of a section of the rows of poles in the motor viewed from within the air gap and axially displaced from their working position, but otherwise in the position in relation to each other that they assume in FIG. 1A.
FIG. 1C shows the motor in the same way as FIG. 1A, with the permanent-magnetic field lines in the stator and rotor inserted.
FIG. 1D is a longitudinal sectional view of the motor of FIG. 1.
FIG. 1E is a view similar to FIG. 1B but shows the stator and rotor poles in the same axial position and displaced to a different relative position and also includes a graph representing the magnetic attraction force acting between a permanent-magnet pole on the stator and a reluctance pole on the rotor.
FIG. 1F is similar to FIG. 1E but shows the starting position. It does not show the rotor in cross-section, but instead shows the rotor in dash-dot outline.

Throughout the drawings, the polarity of the radially magnetized permanent-magnet poles is indicated by an arrow-head pointing towards the North-pole side of the magnet.

Moreover, in all embodiments shown in the drawings, the asymmetry of the stator and/or the rotor poles is directed such that the preferential starting direction of the rotor is counterclockwise.

Figure 1B:
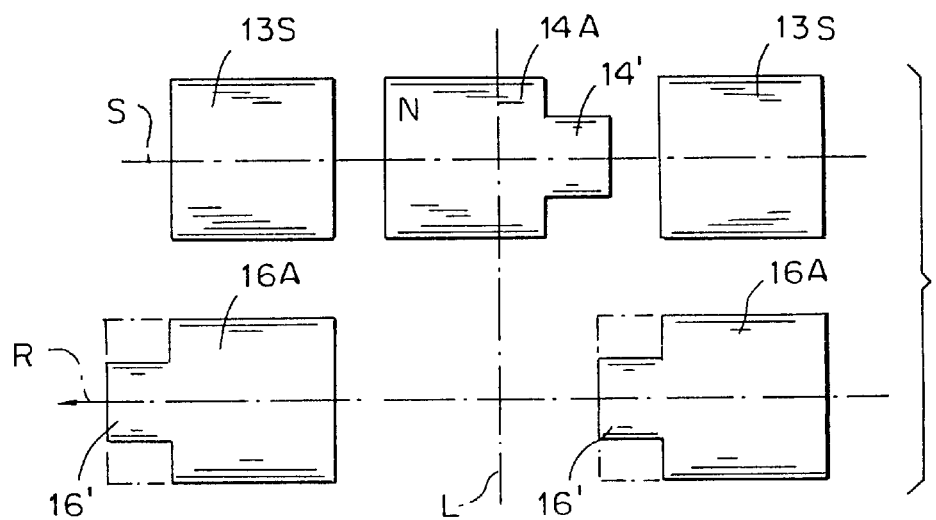
Figure 1C:
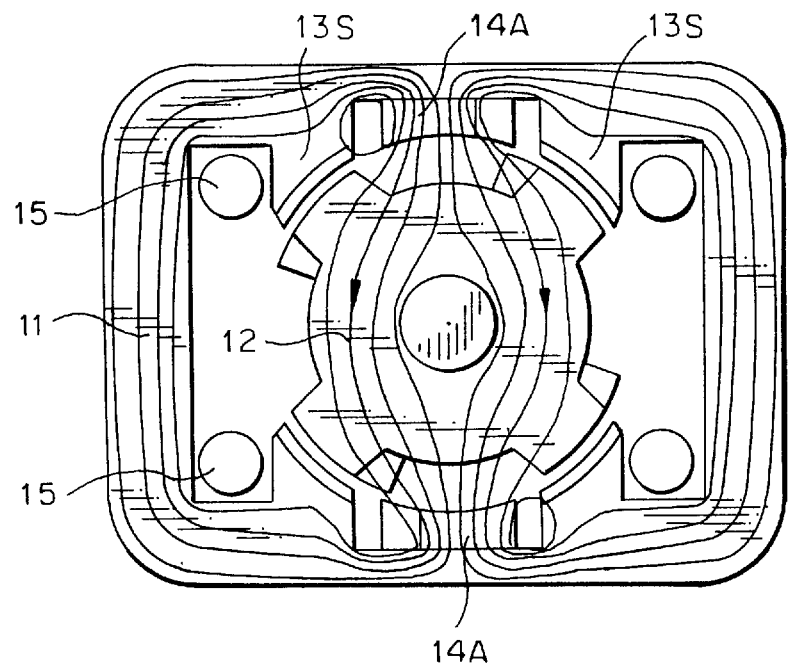
Figure 1D:
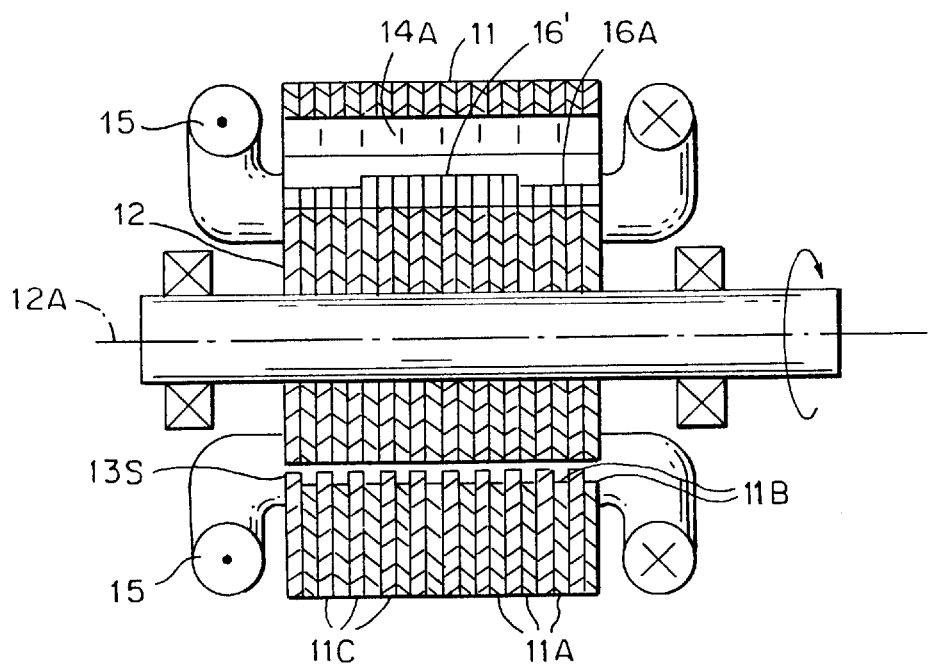

The motor shown in FIGS. 1A–1C is a rotating motor, as are the other motors also, with a first motor part in the form of a laminated ferromagnetic stator 11 and a second motor part in the form of a laminated ferromagnetic rotor 12 journalled for rotary movement in the stator by suitable bearings as shown in FIG. 1D. The axis of rotation of the rotor is indicated by a small circle, designated 12A and the preferential direction of rotation is indicated by an arrow (counterclockwise in all illustrated embodiments).

The stator 11 has two diametrically opposite pole groups. Each pole group comprises two salient ferromagnetic poles 13S, also called reluctance poles, spaced from each other circumferentially with a permanent-magnet pole 14A arranged between them. The surfaces of these poles 14A facing the rotor are located on a cylindrical surface that is concentric with the axis of rotation 12A of the rotor.

For each pole group the stator 11 is also provided with a coil 15 wound around the pole group and forming part of a common magnetizing winding.

On the outside of the rotor 12, distributed uniformly around its periphery, are four salient ferromagnetic poles 16A, also called reluctance poles. The surfaces of these poles facing the stator are located on a cylinder that is concentric with the axis of rotation 12A, a short distance from the cylinder containing the pole surfaces of the stator, so that the pole surfaces of the stator and those of the rotor form an air gap 17 between them. The pole pitch of the rotor 12 corresponds to the spacing of the reluctance poles 13S within each pole group on the stator 11.

In the embodiment shown in FIGS. 1A to 1D, all the poles 13S, 14A on the stator 11 and the poles 16A on the rotor 12 are located in the same plane perpendicular to the axis of rotation, so that during rotation all poles on the rotor pass over and interact with all poles on the stator. The motor may of course have several axially separated sets of pole groups arranged in this manner. Furthermore, instead of being located in closed paths or rows running peripherally around the rotor, the poles on each motor part may be arranged, for example, on helical paths.

The pole surfaces on the reluctance poles 13S of the stator are magnetically symmetrical in the sense intended in this application. The significance of this is that if the rotor 12 were to be replaced by a homogenous ferromagnetic cylinder, the envelope surface of which coincides with the cylindrical surface on which the rotor poles 16A are otherwise located, a magnetic field would flow through the air gap 17 below and around the pole surfaces of the stator poles when the current was supplied to the winding 15, the magnetic field having such distribution that a diagram of the mean value of the magnetic flux density along a generatrix on said ferromagnetic cylinder surface, drawn as a function of the angular position of this cylinder in relation to the stator, would show symmetry of the same type as, for example, a Gaussian curve, i.e. mirror symmetry about a line perpendicular to the abscissa. Said symmetry means that the shape of the diagram is independent of which direction of rotation of the cylinder is defined as positive.

On the other hand, the permanent-magnet poles 14A are magnetically asymmetrical since they have a protrusion 14' on the side facing against the direction of rotation of the rotor, said protrusion being caused by the poles 14A on this side having narrower breadth, i.e. dimension parallel to the axis of rotation 12A, than over the main part of the poles. The part of the permanent-magnet poles 14A with full breadth may be said to constitute a main pole part, while the narrower protrusion may be said to constitute an auxiliary pole part, designated in the figures by 14'.

The reluctance poles 16A on the rotor 12 are also asymmetrical in corresponding manner since they are provided on their leading or counterclockwise side, the side directed in the direction of rotation with a protrusion 16' (auxiliary pole part) having a breadth less than that of the main part (main pole part) of the poles.

As is evident from the above, the asymmetry in the poles can be achieved in ways other than those just described. One example of an alternative method is indicated in dash-dot lines in FIGS. 1A and 1B. In this alternative each pole has the same breadth across its entire axial and circumferential dimension, but at one side the pole surface is offset radially inwards so that the air gap 17 is larger at this side than over the main part of the pole.

FIG. 1B shows a developed view of one of the pole groups of the stator and the rotor in FIG. 1A as viewed from within the air gap 17 and with the rotor poles displaced axially in relation to the stator pole group. The parallel dash-dot lines R and S indicate the direction of the relative movement between rotor and stator. The dash-dot lines R and S also are lines (alternatively described as paths, circles, or rows) along which the poles are deployed. The dash-dot line L perpendicular thereto represents the centre line between the stator poles. The position of the stator and rotor poles in relation to each other corresponds to the relative position shown in FIG. 1A and is the stable position the rotor assumes in relation to the stator when current is supplied to the winding 15 so that the reluctance poles 13S tend to keep the rotor poles 16A in an attracted or indrawn position with the main pole parts opposite to the reluctance poles.

When current is no longer supplied to the winding in this rotor position, then only the permanent-magnetic flux from the permanent-magnet poles 14A acts on the rotor to pull it further in the direction of the starting position. FIG. 1C shows the flux pattern of the permanent-magnet poles in this position.

As is shown in FIGS. 1A–1D, in the indrawn position the auxiliary pole parts 16' of two of the rotor poles 16A, the upper right and the lower left rotor poles, extend up to the auxiliary pole parts 14' of the permanent-magnet poles 14 and preferably even overlap the auxiliary pole parts slightly. This relative position of the permanent-magnet poles and the auxiliary pole parts of the rotor poles is a position in which the magnetic attraction force the permanent-magnet poles 14 exert on these rotor poles, and hence the counterclockwise torque applied to the rotor 12 by the permanent-magnet poles 14A, is at or near its maximum, the winding coils being currentless.

At the same time, the spacing of the other two rotor poles 16, the upper left and the lower right rotor poles, from the permanent-magnet poles 14A is substantial so that the permanent magnet-poles only apply an insignificant clockwise torque to the rotor.

Accordingly, the net counterclockwise torque applied to the rotor by the permanent-magnet poles 14A is capable of forcefully jerking the rotor 12 counterclockwise from the indrawn position and turn it through an angle corresponding to one-half of the rotor pole pitch to bring the rotor poles 16A to the starting position (pull-in movement).

Throughout the pull-in movement of the rotor from the indrawn position to the starting position the magnetic flux between each permanent-magnet pole 14A and the rotor pole which it overlaps and with which it interacts increases steadily with increasing pole overlap so that a counterclockwise torque is exerted on the rotor 12 until the starting position has been reached.

In the starting position each of the two first-mentioned rotor poles 16A is magnetically aligned with respectively the upper and the lower permanent-magnet pole 14A, a portion of the auxiliary pole part 16' on the leading end of the rotor pole 16A extending in the counterclockwise direction beyond the permanent-magnet pole and the trailing end of the rotor pole being positioned opposite to the auxiliary pole part 14' of the permanent-magnet pole. This is shown in FIG. 1F.

Figure 1E:
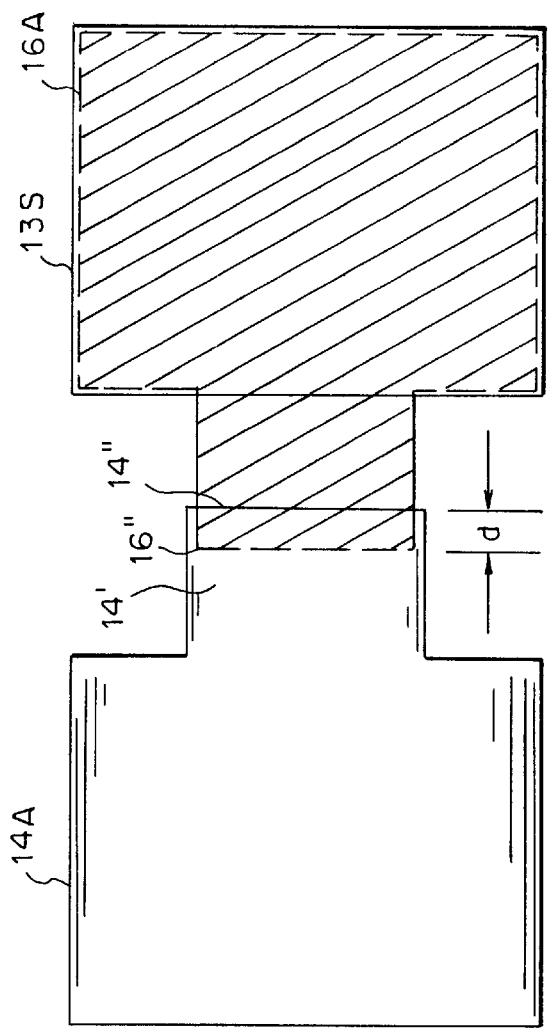
Figure 1E:
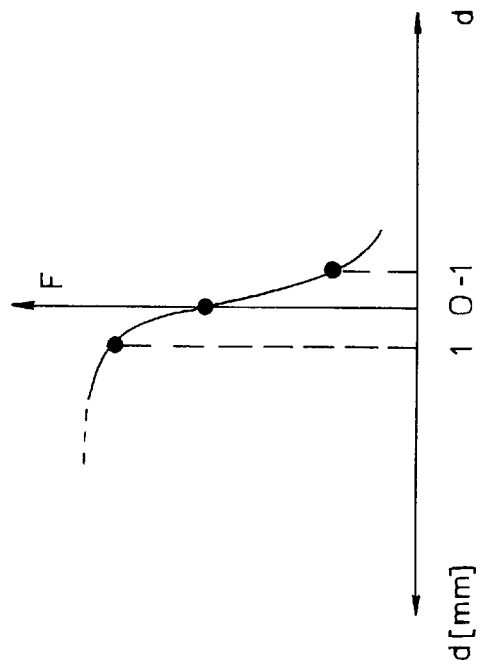
Figure 1E:
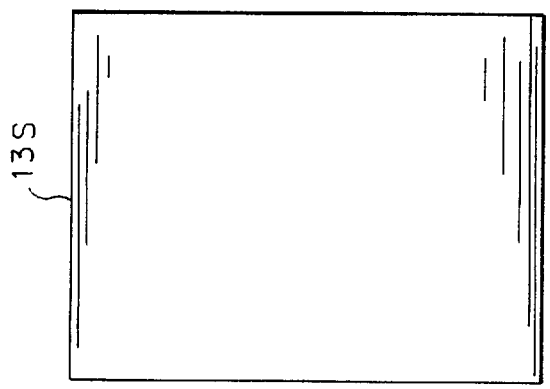

FIG. 1E includes a graph representative of an exemplary embodiment of the motor shown in FIGS. 1A to 1D which shows the pull-in force F acting between the permanent-magnet poles 14 and the rotor reluctance poles 16 as a function of the overlap d of the leading end 16" of the rotor reluctance pole 16 and the corresponding edge 14" of the permanent-magnet pole 14A, during the pull-in movement from the indrawn position to the starting position. In the right-hand portion of FIG. 1E the indrawn position of the rotor reluctance pole 16A is shown as a cross-section. The view is looking outward through a cylindrical surface, centered on the rotation axis 12A, slightly smaller in diameter than the rotor. FIG. 1E shows the features of FIG. 1B, but overlapped.

The graph shows the pull-in force F acting on the rotor reluctance pole 16 for different amounts of overlap (positive d) and separation (negative d) between the auxiliary pole part 14' of the permanent-magnet pole 14A and the auxiliary pole part 16' of the rotor reluctance poles 16A in the indrawn position.

From FIG. 1E it is apparent that if the overlap in the indrawn position is −1 mm, that is, if the leading end 16" of the reluctance pole 16 is spaced 1 mm in the negative or clockwise direction from the permanent-magnet pole, the pull-in force is quite small. If the leading end 16" is opposite the end of the auxiliary pole part 14' (zero overlap), the pull-in force is substantially greater, and for a positive overlap of about 1 mm the pull-in force on the auxiliary pole part 16' is at or near its maximum where it is three to four times the pull-in force for a negative overlap of about 1 mm. The asymmetry of the stator permanent-magnet pole 14 in conjunction with the asymmetry of the rotor reluctance pole 16 thus produces a dramatic increase of the initial value of the pull-in force in comparison with the case where only the rotor reluctance pole is asymmetrical as in the motor disclosed in WO92/12567. This increase of the pull-in force broadens the field of application of the motor according to the invention.

From FIG. 1E it is also apparent that as the overlap then gradually increases during the pull-in movement, the pull-in force remains approximately constant during the first portion of the pull-in movement, namely until the main pole parts begin to overlap. During the continued pull-in movement the pull-in force will first increase and then gradually drop to zero as the reluctance pole 16A reaches the starting position.

Moreover, FIG. 1E shows that during the counterclockwise pull-in movement of a rotor reluctance pole 16A from the indrawn position to the starting position, the permanent-magnet pole 14A will exert a substantial attraction force on the rotor reluctance pole throughout a circumferential distance which is greater than the circumferential dimension of the permanent-magnet pole 14A: from a position in which the leading end 16" is opposite to or only slightly spaced in the clockwise direction from the end 14" of the auxiliary pole part 14' of the permanent-magnet poles 14A up to a point in which the leading end 16" is well past the permanent-magnet pole.

When the winding coils 15 are again energized with the rotor poles in the starting position, the auxiliary pole part 16' of all four rotor poles 16A will therefore be near a stator reluctance pole 13S ahead of it as seen in the direction of rotation of the rotor. On the other hand, the spacing of the trailing end of each rotor pole from the stator reluctance pole behind it is substantial. The magnetic attraction in the counterclockwise direction between the stator reluctance pole 13S and the leading end 16" of the rotor reluctance pole 16A behind it will thus be heavily predominant over the magnetic attraction in the clockwise direction exerted on the trailing end of the same rotor pole by the next stator reluctance pole (i.e. the reluctance pole behind the rotor pole).

Accordingly, the net torque applied to the rotor by the stator reluctance poles 13S will act in the counterclockwise direction and will be high so that the motor will be capable of starting against a considerable load. Again, the magnetic flux produced as a consequence of the energization of the winding coils opposes the magnetic flux produced by the permanent-magnet poles 14A so that the permanent-magnet poles do not substantially counteract the movement from the starting position.

The embodiments illustrated in the other figures are described only insofar as they differ from the embodiment shown in FIGS. 1A–1D. The same designations are used throughout for all embodiments, with the suffix letter A or S indicating asymmetrical or symmetrical. Unless otherwise stated, "symmetry" and "asymmetry" with regard to the poles relates to their magnetic symmetry or asymmetry rather than their geometrical symmetry or asymmetry (which may or may not correspond to the magnetic symmetry or asymmetry).

Figure 2A:
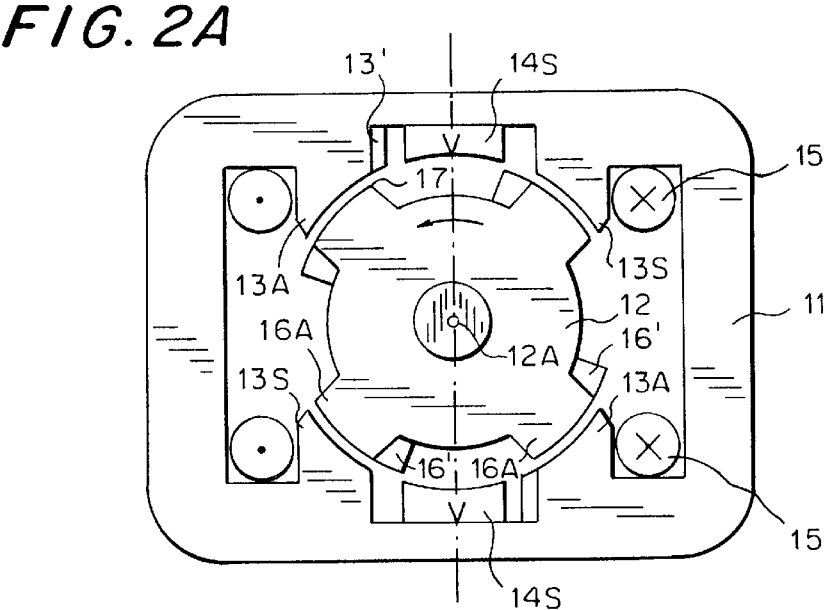
FIGS. 2A, 2B and 2C show a second embodiment in corresponding manner to FIGS. 1A, 1B and 1C.
Figure 2B:
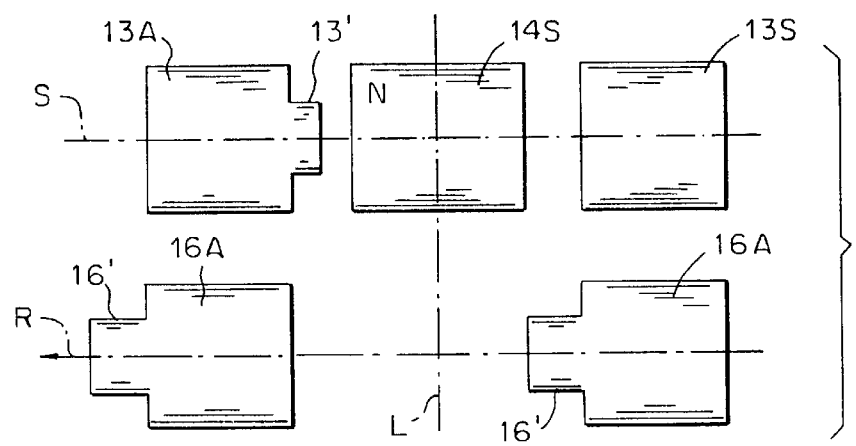
Figure 2C:
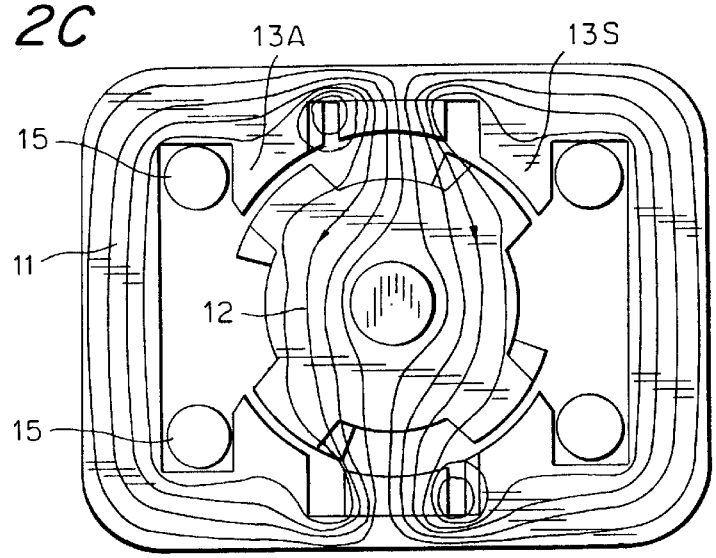

The motor in FIGS. 2A–2C differs from the motor in FIGS. 1A–1C only with regard to the stator poles. More specifically, one stator reluctance pole 13A in each stator pole group is magnetically asymmetrical with an auxiliary pole 13' of the same type as the auxiliary pole 16' on the rotor poles 16A, whereas the other reluctance pole 13S and the permanent-magnet poles 14S are magnetically symmetrical. The auxiliary pole parts 13' amplify the above-described effect of the auxiliary rotor pole parts 16' when the winding coils are energized with the rotor poles in the starting position.

Figure 3A:
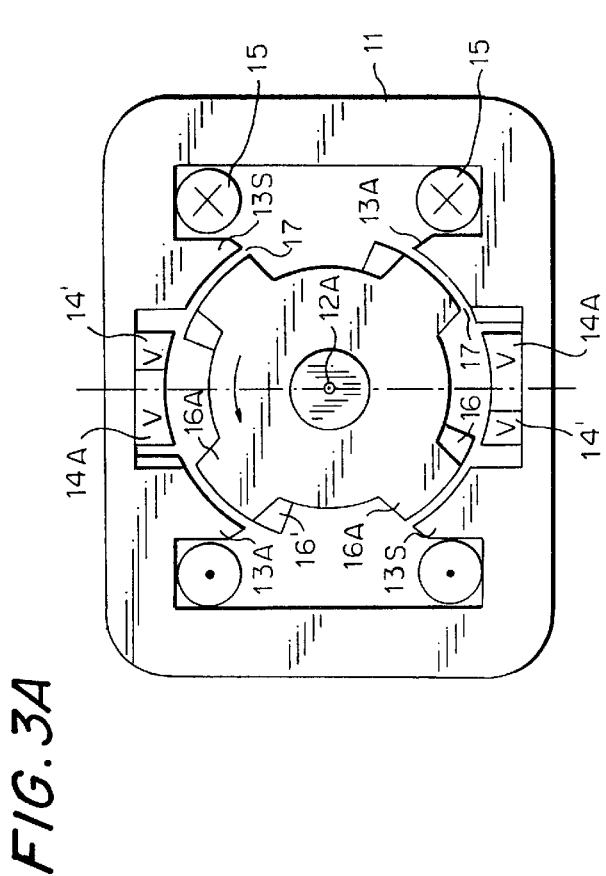
Figure 3B:
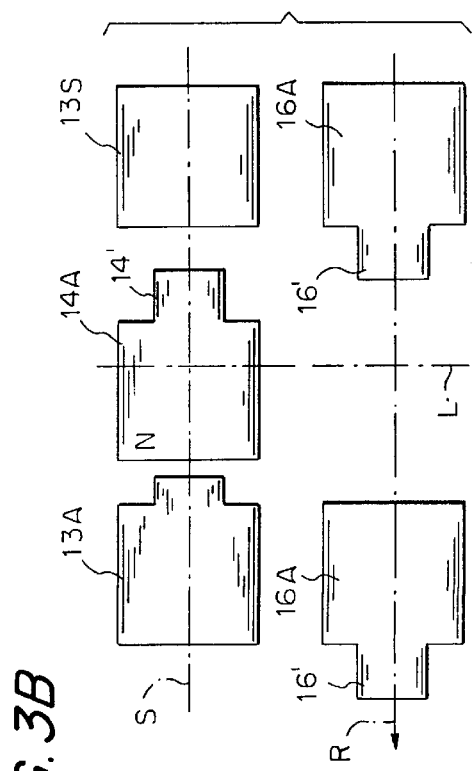

The motor in FIGS. 3A, 3B also differs from the motor in FIGS. 1A–1C only with regard to the stator poles. In this case the stator reluctance poles 13A and 13S in each stator pole group are the same as in FIGS. 2A, 2B, i.e. one is asymmetrical and the other is symmetrical. However, the permanent-magnet poles 14A are asymmetrical with an auxiliary pole 14' of the same type as the rotor auxiliary pole 16', with the asymmetry directed in the same direction as the asymmetry of the stator reluctance pole 13A. Consequently, asymmetry exists in all three pole types in this motor.

FIGS. 2A, 2B and 3A, 3B, as well as some of the following figures, show that all poles of a certain type, whether reluctance poles or permanent-magnet poles, in a pole group need not necessarily be of the same kind in respect of symmetry or asymmetry. This is true for all embodiments.

Figure 4A:
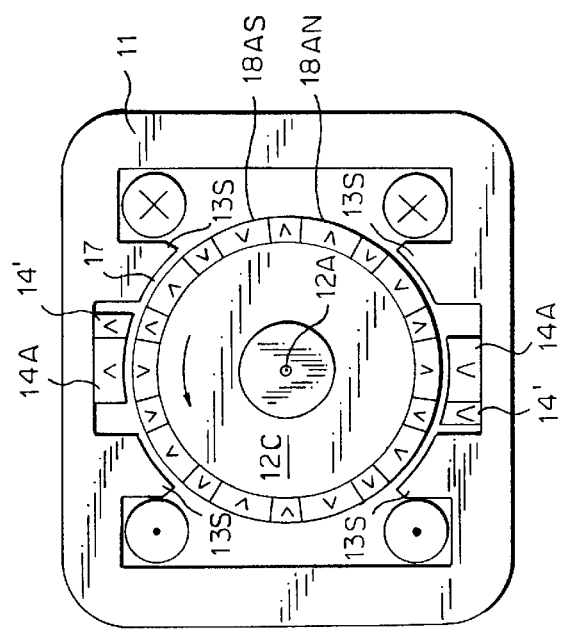
Figure 4B:
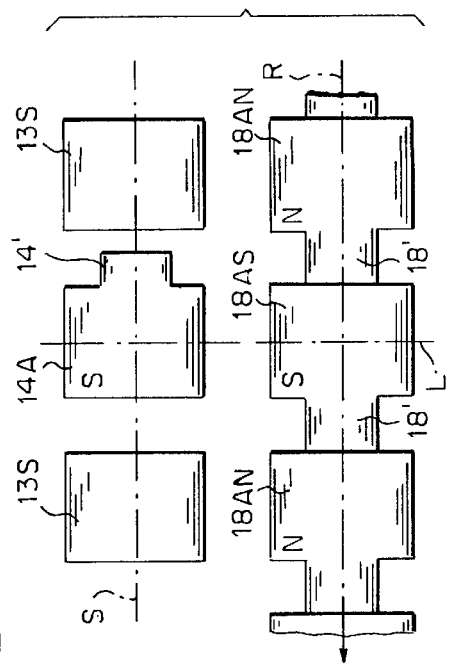

The motor in FIGS. 4A, 4B has two symmetrical stator reluctance poles 13S and one asymmetrical stator permanent-magnet pole 14A in each pole group and, as far as the stator 11 is concerned, therefore agrees with the motor in FIGS. 1A–1C. In this case, however, the rotor 12C is designed differently from the rotor 12 in the previous embodiments, partly since it has only permanent-magnet poles 18AN and 18AS, asymmetrical ones with auxiliary poles 18' facing the same way, and partly since these permanent-magnet poles are arranged without spaces around the periphery of the rotor body, adjacent poles having opposite polarities, N and S, respectively.

Figure 5A:
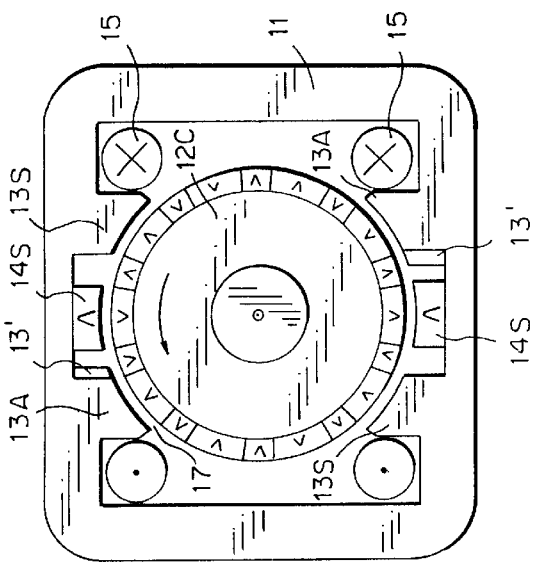
Figure 5B:

In the motor in FIGS. 5A, 5B each stator pole group has only two reluctance poles, i.e. symmetrical reluctance poles 13S, and the stator 11 thus lacks permanent-magnet poles. The rotor 12C is similar to the rotor in FIGS. 4A, 4B except that the permanent-magnet poles 18AN, 18AS are shaped slightly differently.

Figure 6A:
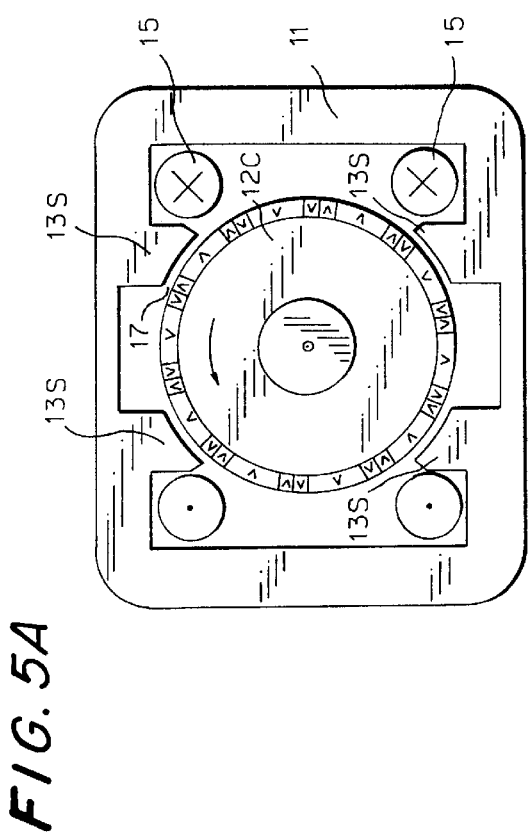
Figure 6B:
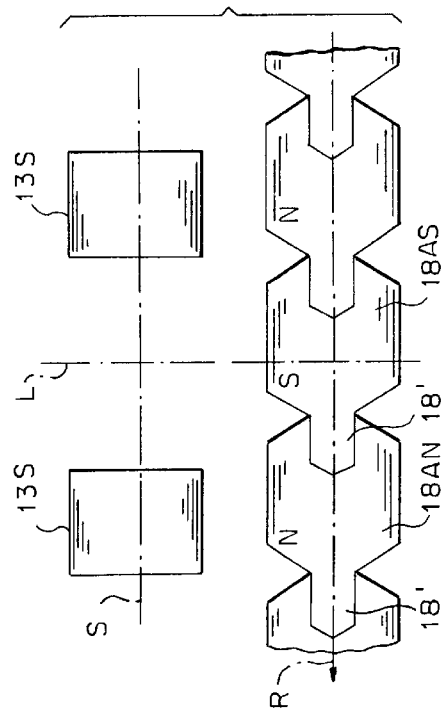

In the motor in FIGS. 6A, 6B, as in the motor in FIGS. 2A–2B, the stator pole groups have one asymmetrical and one symmetrical reluctance pole 13A and 13S, respectively, combined with a symmetrical permanent-magnet pole 14S, while the rotor 12C is the same as the rotor in FIGS. 4A, 4B.

Figure 7A:
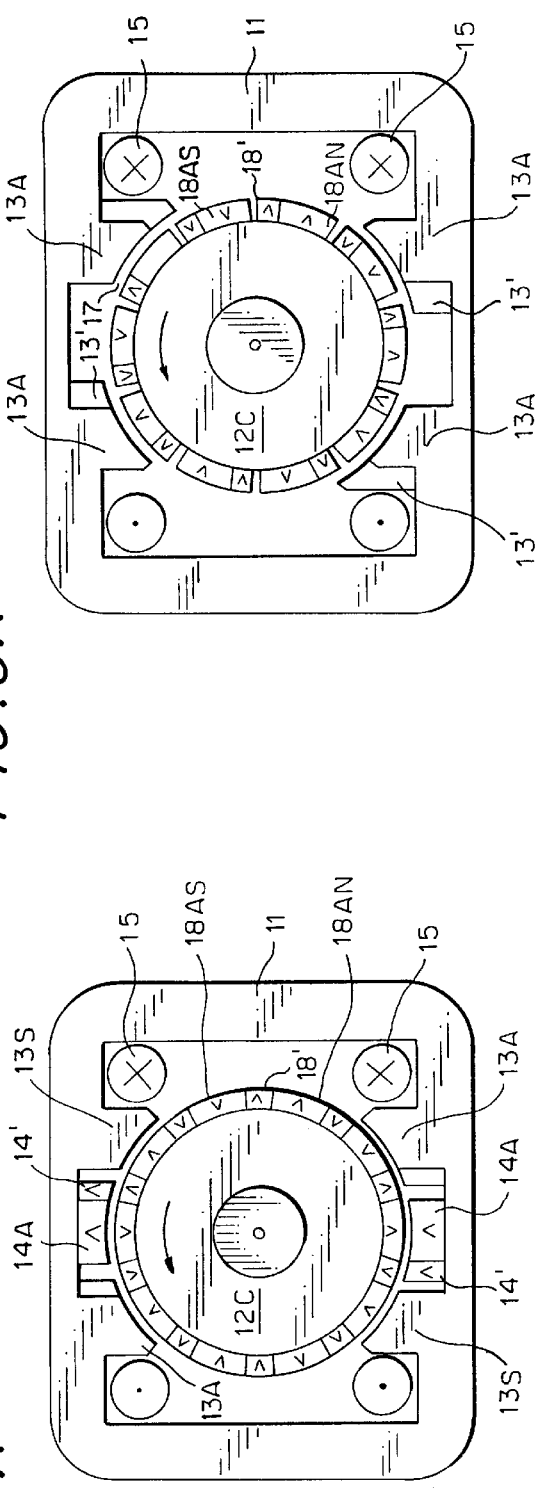
Figure 7B:
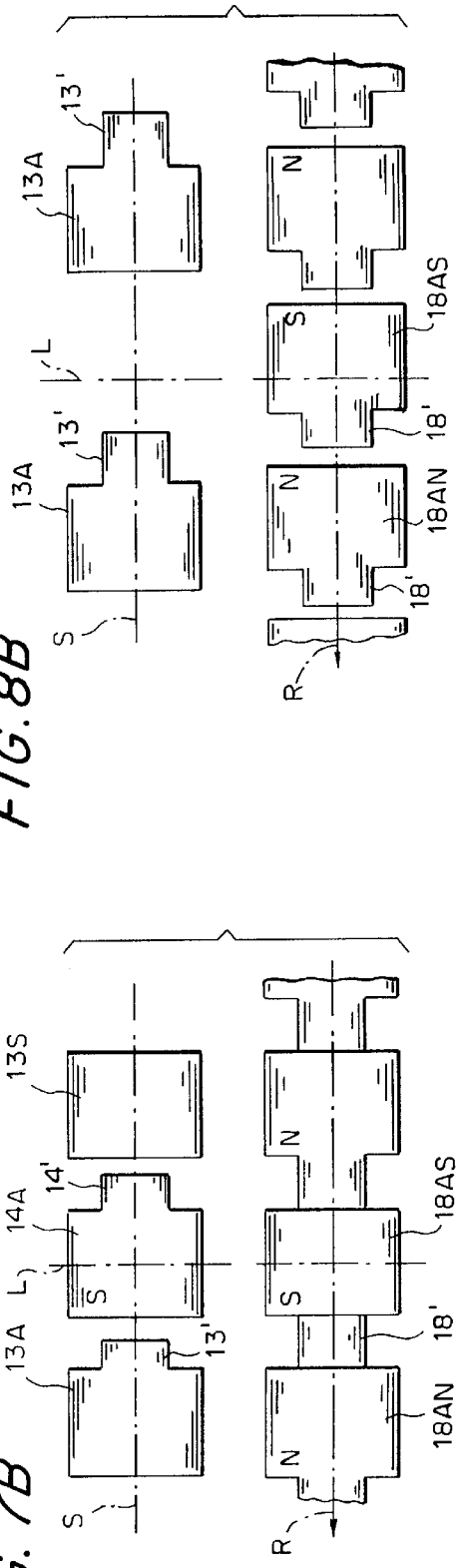

The motor in FIGS. 7A, 7B has stator pole groups of the same type as the motor in FIGS. 3A, 3B, i.e. with one asymmetrical and one symmetrical reluctance pole 13A and 13S, respectively, and an asymmetrical permanent-magnet pole 14A, and the rotor 12C is of the same design as in FIGS. 4A, 4B and 6A, 6B.

Figure 8A:
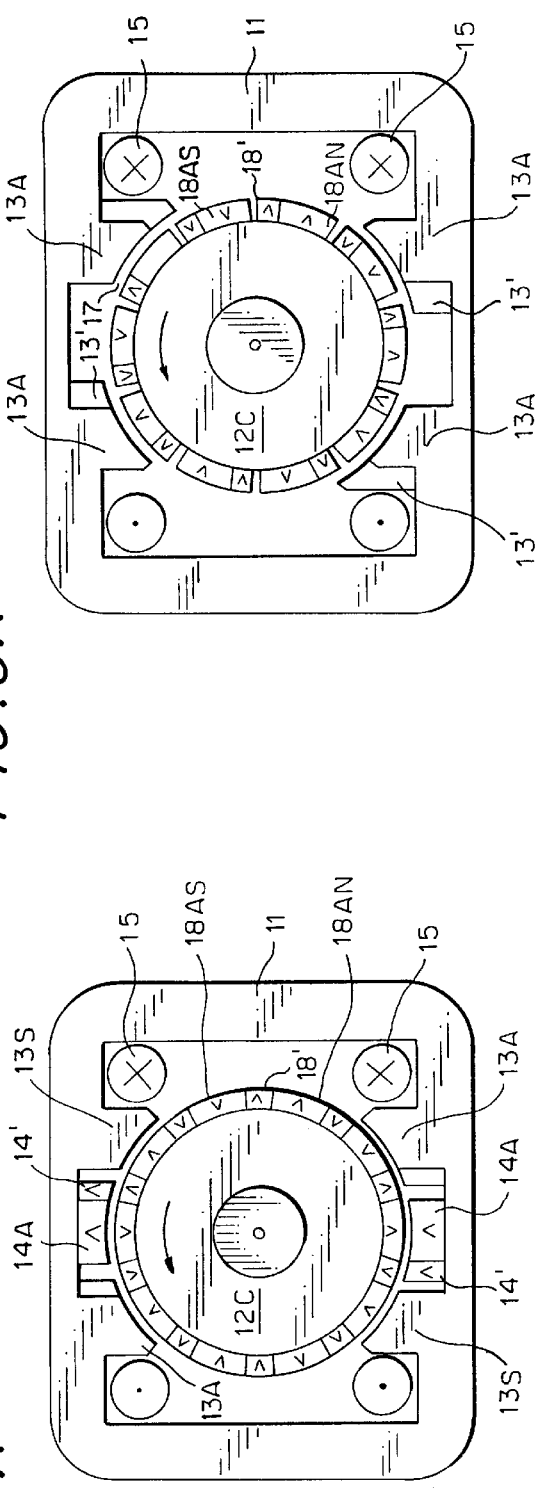
Figure 8B:
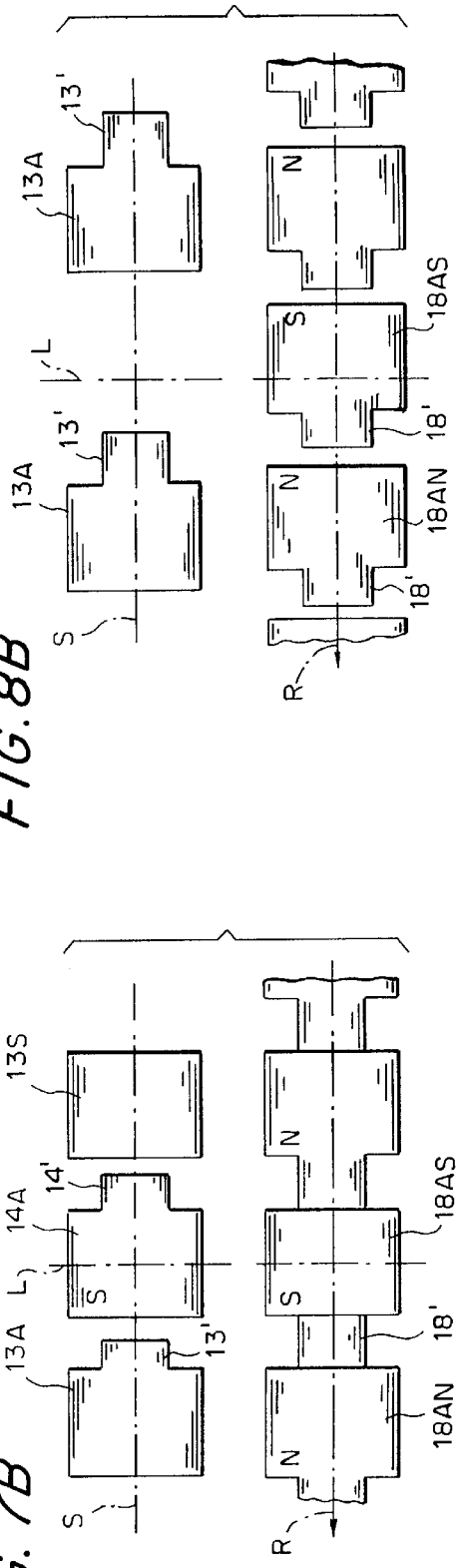

The stator pole groups of the motor in FIGS. 8A, 8B have only asymmetrical reluctance poles 13A and thus no permanent-magnet poles, and the rotor is very similar to that in FIGS. 4A, 4B and 6A, 6B.

Figure 9A:
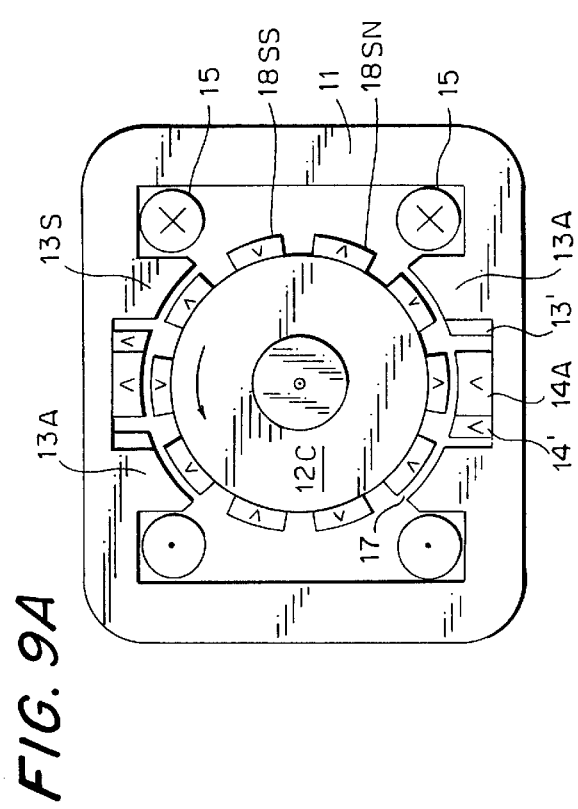
Figure 9B:
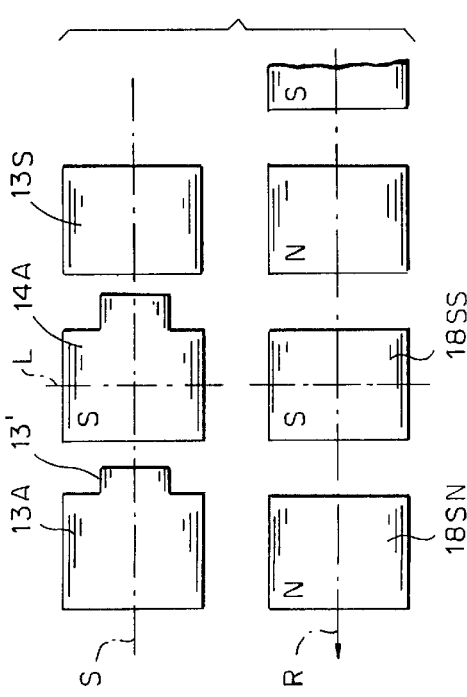

In the motor in FIGS. 9A, 9B, stator pole groups are used which have a pole combination corresponding to that in the motor in FIGS. 7A, 7B—an asymmetrical reluctance pole 13A, a symmetrical reluctance pole 13S and an asymmetrical permanent-magnet pole 14A—together with symmetrical permanent-magnet poles 18SN, 18SS of alternating polarity on the rotor.

Figure 10A:
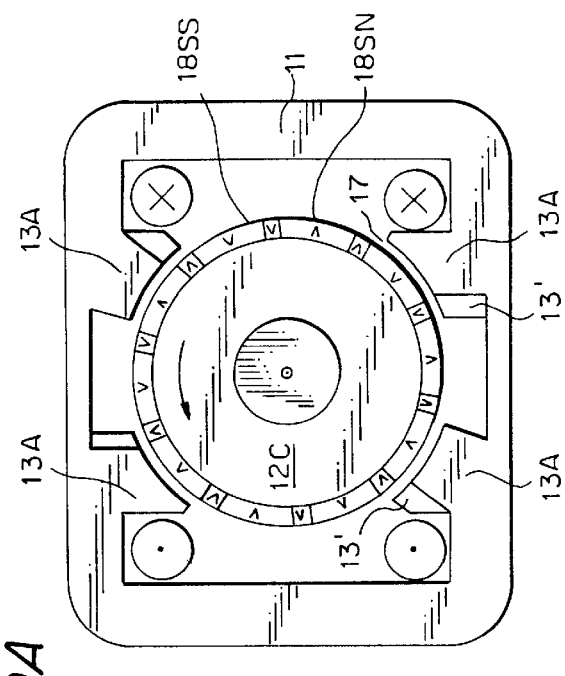
Figure 10B:
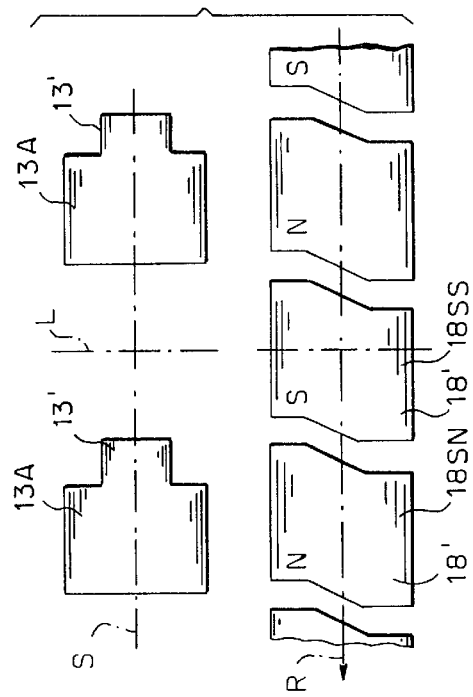

Like the motor in FIGS. 8A, 8B, the motor in FIGS. 10A, 10B has stator pole groups with only reluctance poles, i.e. asymmetrical reluctance poles 13A with a relatively long auxiliary pole 13'. As in the motor in FIGS. 9A, 9B, the rotor 12C has only magnetically symmetrical permanent-magnet poles 18SN, 18SS, in this case however with partially skewed edges.

Figure 11A:
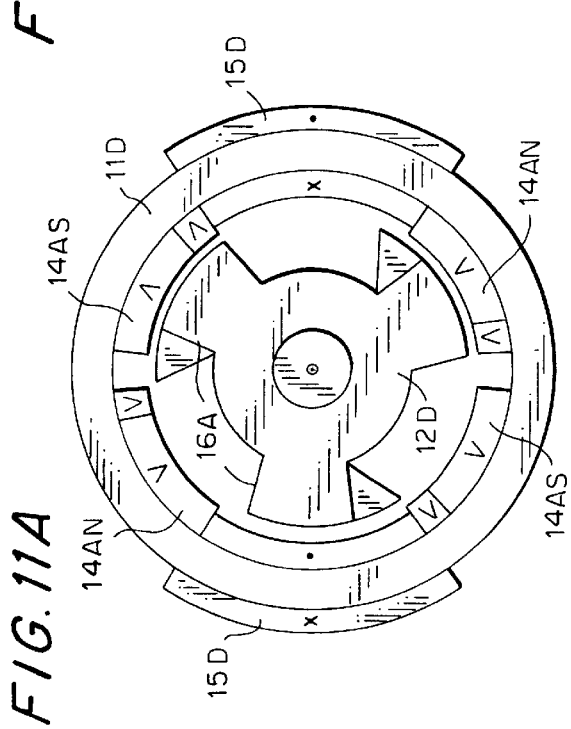
Figure 11B:
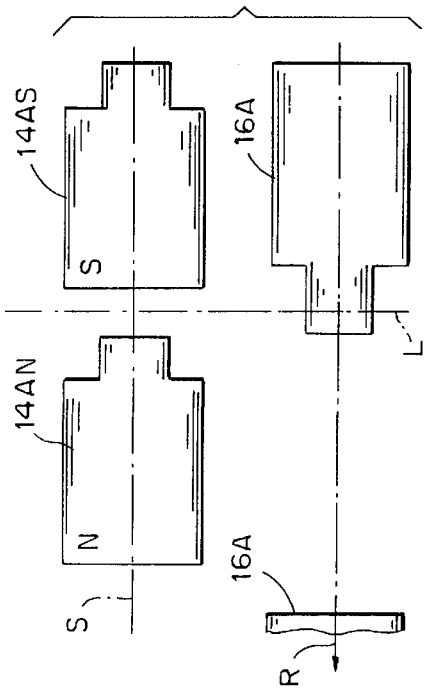

FIGS. 11A, 11B show a motor in which the rotor 12D resembles the rotor 12C in FIGS. 1A to 1D except that it is provided with three asymmetrical reluctance poles 16A. In this case the stator 11D is circular and only provided with permanent-magnet poles, namely two diametrically opposite groups of asymmetrical permanent-magnet poles 14AN, 14AS, each group comprising two spaced poles of alternating polarity N and S, the pole pitch being one-half of the rotor pole pitch. Moreover, in this motor the winding coils 15D are supplied with current pulses of alternating polarity. The winding coils 15D differ from the winding coils of the preceding embodiments in that they are sectionally toroid-wound around the stator 11D.

Other combinations of poles on stator and rotor are also possible within the scope of the invention. Besides the pole arrangements illustrated and described above, the following list includes examples of pole arrangements falling within the scope of the invention.

I. Symmetrical Reluctance Poles on the Stator
A. Asymmetrical permanent-magnet poles on the stator (in symmetrical or asymmetrical placement)
  1. Reluctance poles on the rotor
    a. Asymmetrical reluctance poles FIG. 1
    b. Symmetrical reluctance poles
  2. Permanent-magnet poles on the rotor
    a. Asymmetrical permanent-magnet poles (arranged in symmetrical or asymmetrical pole row) FIG. 4
    b. Symmetrical permanent-magnet poles (arranged in symmetrical or asymmetrical pole row)
B. Symmetrical permanent-magnet poles (in asymmetrical placement on the stator)
  1. Reluctance poles on the rotor
    a. Asymmetrical reluctance poles
    b. Symmetrical reluctance poles FIG. 12
C. Lacks permanent-magnet poles on the stator
  1. Permanent-magnet poles on the rotor
    a. Asymmetrical permanent-magnet poles FIG. 5
    b. Symmetrical permanent-magnet poles arranged in asymmetrical pole row II. Asymmetrical Reluctance Poles on the Stator
A. Symmetrical permanent-magnet poles on the stator
  1. Reluctance poles on the rotor
    a. Asymmetrical reluctance poles FIG. 2
    b. Symmetrical reluctance poles
  2. Permanent-magnet poles on the rotor
    a. Asymmetrical permanent-magnet poles FIG. 6
B. Asymmetrical permanent-magnet poles on the stator
  1. Reluctance poles on the rotor
    a. Asymmetrical reluctance poles FIG. 3
    b. Symmetrical reluctance poles
  2. Permanent-magnet poles on the rotor
    a. Asymmetrical permanent-magnet poles FIG. 7
    b. Symmetrical permanent-magnet poles FIG. 9
C. Lacks permanent-magnet poles on the stator
  1. Permanent-magnet poles on the rotor
    a. Asymmetrical permanent-magnet poles (arranged in symmetrical or asymmetrical pole row) FIG. 8
    b. Symmetrical permanent-magnet poles (arranged in symmetrical or asymmetrical pole row) Fig. 10

Figure 12A:
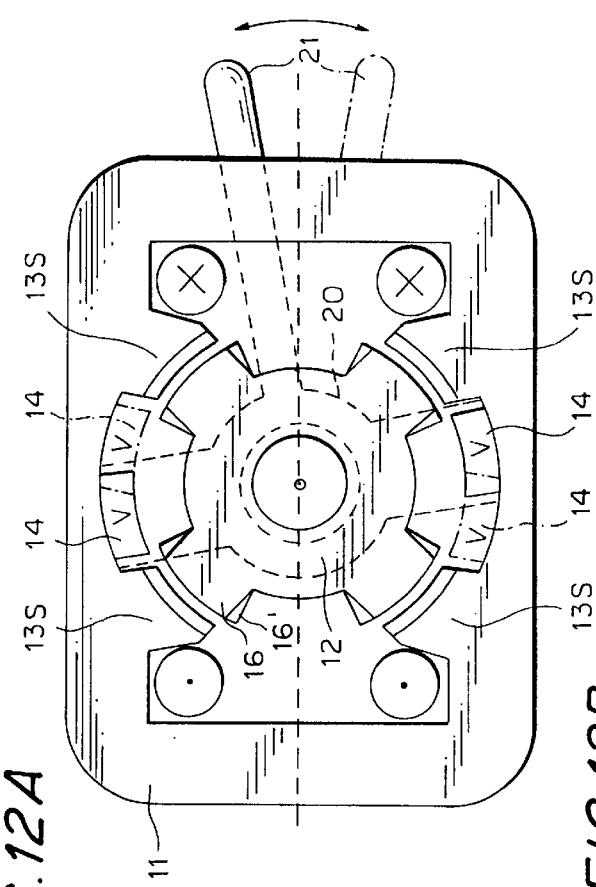
Figure 12B:
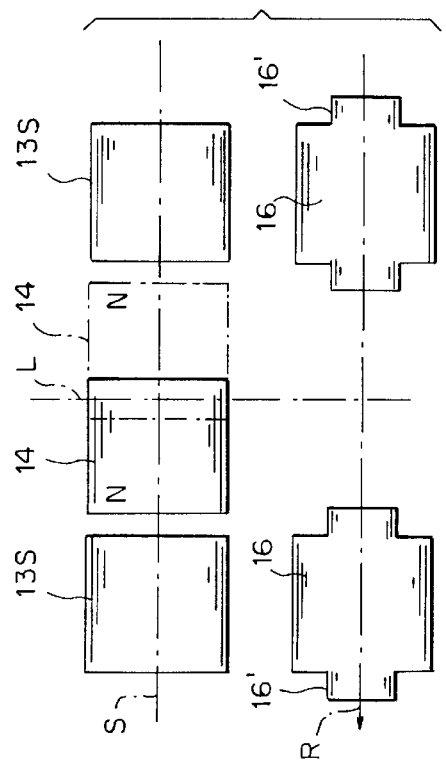

III. Symmetrical Permanent-magnet Poles Only on the Stator
A. Stator poles arranged in a symmetrical pole row
  1. Reluctance poles on the rotor
    a. Asymmetrical reluctance poles
B. Stator poles arranged in asymmetrical pole row
  1. Reluctance poles on the rotor
    a. Asymmetrical reluctance poles
    b. Symmetrical reluctance poles IV. Asymmetrical Permanent-magnet Poles on the Stator
A. Stator poles arranged in symmetrical Pole row
  1. Reluctance poles on the rotor
    a. Asymmetrical reluctance poles FIG. 11
    b. Symmetrical reluctance poles
B. Stator poles arranged in asymmetrical pole row
  1. Reluctance poles on the rotor
    a. Asymmetrical reluctance poles
    b. Symmetrical reluctance poles FIGS. 12A and 12B show a motor which is also within the scope of the invention. All individual poles, both those on the stator and those on the rotor, are magnetically symmetrical. In this motor the object of the invention is instead achieved by magnetic asymmetry within the pole groups on the stator, namely by asymmetrical positioning of a symmetrical permanent-magnet pole between a pair of symmetrical reluctance poles of the pole groups. As the rotor is also provided with symmetrical reluctance poles, the motor shown in FIGS. 12A, 12B may be regarded as belonging to category I.B.1.b. in the above categorization.

More particularly, the motor shown in FIGS. 12A, 12B comprises a stator 11 having reluctance poles 13S similar to those shown in FIGS. 1A to 1D. The rotor 12 also resembles the rotor in FIGS. 1A to 1D, except that its poles 16 are provided with auxiliary pole parts 16' both at the leading end and at the trailing end and these auxiliary pole parts are of lesser circumferential dimension.

Each pole group comprises a rectangular magnetically symmetrical permanent-magnet pole 14 which is placed in an asymmetric or off-centre position adjacent to one of the two reluctance poles 13S. The two permanent-magnet poles 14 are connected to a common actuating mechanism 20 including a lever 21. In operation of the motor the permanent-magnet poles 14 are stationary in the selected off-centre position, but by shifting the lever 21 downwards from the position shown in full lines in FIG. 12A, the permanent-magnet poles 14 can be moved circumferentially from the illustrated off-centre position to a corresponding off-centre position (indicated in dash-dot lines in FIGS. 12A, 12B) adjacent to the other stator reluctance poles 13S to reverse the preferential direction of rotation of the rotor.

The rotor 12 is shown with its poles 16 in the indrawn or attracted position. In this position the auxiliary pole parts 16' at the trailing end (assuming counterclockwise rotation of the rotor) of two of the rotor poles, the upper left pole and the lower right pole, is closely adjacent to one end of each permanent-magnet pole 14 and preferably there is a slight overlap between each permanent-magnet pole and the adjacent one of these rotor poles. The spacing of the opposite side of each permanent-magnet pole 14 and the other adjacent rotor pole is substantial.

Accordingly, in the illustrated indrawn rotor position, the magnetic attraction between each permanent-magnet pole 14 and the rotor pole 16 ahead of it, as seen in the direction of rotation of the rotor, will be heavily predominant over the magnetic attraction between the permanent-magnet pole and the rotor pole behind it. When the current in the winding coils 15 is switched off with the rotor in the illustrated position, the permanent-magnet poles 14 therefore will pull the rotor clockwise to the starting position.

In the starting position the auxiliary pole parts 16' on the leading end of the rotor poles 16 will be closely adjacent to, and preferably slightly overlap, the two stator reluctance poles 13S ahead of them. When the winding coils 15 are then again energized, these reluctance poles can therefore forcefully jerk the rotor in the counterclockwise direction away from the starting position as described above with reference to FIGS. 1A to 1E.

FIGS. 13A to 13D are views corresponding to FIGS. 1B, 2B, 3B etc. and serve to further elucidate the concept of magnetically symmetrical and asymmetrical positioning of a permanent-magnet pole between a pair of reluctance poles on the stator. These four figures show four different shapes of the permanent-magnet pole together with a stator and rotor reluctance pole combination which is the same in all figures and similar to that in FIGS. 1A and 1B. All four figures show the rotor reluctance poles 16A in the starting position, that is magnetically aligned with the permanent-magnet pole 14S (FIG. 13A) or 14A (FIGS. 13B to 13D), the winding associated with the stator pole group being currentless.

In the starting position the force exerted on the rotor reluctance pole 16 by the permanent-magnet pole 14S, 14A is zero in the circumferential direction but in response to any deviation of the rotor pole from the aligned position the attraction force between the permanent-magnet pole and the rotor pole will develop a circumferential component tending to return the rotor pole to the starting position.

Figure 13A:
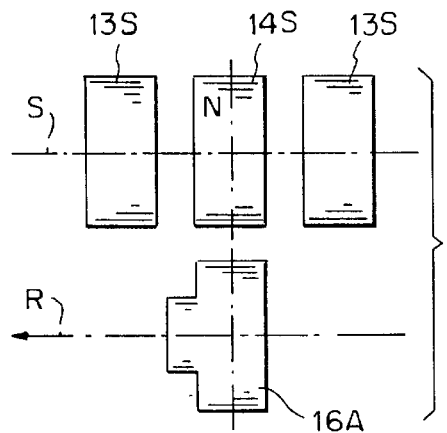
FIGS. 13A to 13D are developed views resembling FIG. 1B of pole combinations which differ from each other in respect of the shape and placement of a permanent-magnet pole on the stator.
Figure 13B:
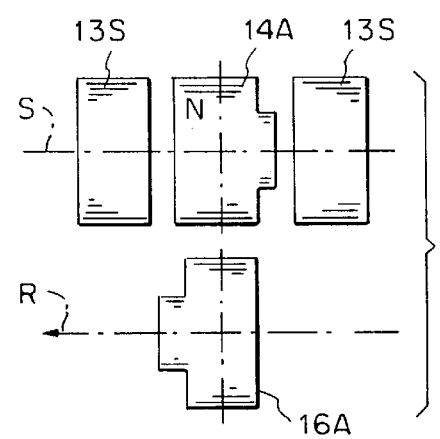
Figure 13C:
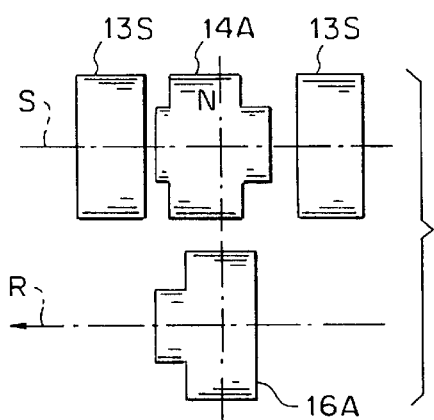
Figure 13D:
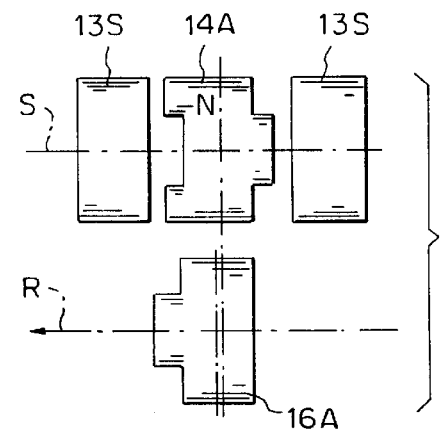

In FIG. 13A, which is included for comparison and shows a symmetrical pole configuration corresponding to that shown in WO92/12567, the permanent-magnet pole 13S completely overlaps the main pole part 16A of the rotor reluctance pole 16. FIGS. 13B–13D show different stator pole configurations according to the invention which are asymmetrical by virtue 35 of asymmetrical shape of the permanent-magnet pole (FIGS. 13B–D) and/or by virtue of asymmetrical positioning thereof (FIG. 13D).

In FIG. 13D the stator pole group consisting of the poles 13S and 14A is asymmetrical both by virtue of pole asymmetry of the permanent-magnet pole 14 and by virtue of a slightly asymmetric positioning of that pole (towards the left stator reluctance pole 13S), resulting in a slightly asymmetrical aligned position of the rotor reluctance pole 16A between the two stator reluctance poles 13S. Consequently, the distance the rotor pole 16A traverses when it moves from the position in which it is magnetically aligned with the right stator reluctance pole to the position in which it is magnetically aligned with the permanent-magnet pole 14A is slightly longer than the distance it traverses from the last-mentioned position to the position in which it is magnetically aligned with the left reluctance pole 13S.

Although magnetic asymmetry on the rotor resulting from asymmetrical positioning of poles is not shown in the drawings, such asymmetry, alone or in combination with asymmetry of individual poles, such asymmetry in the stator-rotor pole system is also possible. For example, in rotors of the kind shown in FIGS. 4A, 4B to FIGS. 10A, 10B, in which permanent-magnet poles of one polarity alternate with permanent-magnet poles of the other polarity, the permanent-magnet poles of one polarity may be collectively displaced in either circumferential direction from the central position between adjacent permanent-magnet poles of the other polarity, the poles within each set of like-polarity poles still being substantially evenly spaced-apart.

In all embodiments illustrated in the drawings, the stator and the rotor are laminated from thin electrical-steel plates as is indicated in FIG. 1D (where the thickness of the plates is heavily exaggerated for clearness of illustration).

In the portions of the plates which form the stator reluctance poles 13S or 13A, every second stator plate 11A is slightly reduced such that the curved plate edges 11B facing the air gap 17 are offset radially outwardly relative to the neighbouring plates, see FIG. 1A and the lower portion of FIG. 1D. In other words, only every second plate 11C extends up to the air gap 17 while the intervening plates 11A end short of the air gap 17. A similar reluctance pole design is or may be provided in the stator and or the rotor of all those motors in which both the stator and the rotor are provided with reluctance poles.

This thinning out of the plate stack at the pole face of the reluctance poles serves to ensure that the change of the flux in the air gap between the stator and rotor reluctance poles that takes place as the rotor reluctance poles move past the stator reluctance poles is proportional to the change of the pole overlap area. In other words, they serve to ensure that the flux density in the pole overlap area is substantially constant as long as the flux change is not limited by magnetic saturation in a different region of the magnetic circuit so that the torque developed by the interaction of the poles will be as uniform as possible.

Magnetically, the effect of the reduction or shortening of the reluctance pole portion of every second plate is a 50% lowering of the averaged value of the saturation flux density across the pole face serving the purpose of reducing the magnetic induction swing (the interval in which the flux density varies over an operating cycle of the motor) in the bulk of the laminated stack, where the predominant part of the iron losses arise.

Figure 14A:
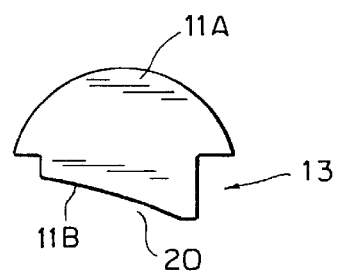
FIGS. 14A, 14B are fragmentary views showing a modified form of the stator reluctance poles of the motor shown in FIGS. 1A, 1B.
Figure 14B:
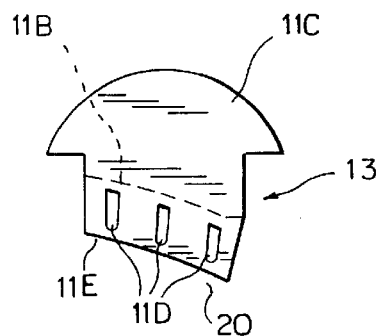

FIGS. 14A and 14B show a modified technique for thinning out the reluctance poles at the pole faces. This modified technique, which is suitable for motors running at elevated operating frequencies, is not limited to the single-phase motors described above but is generally applicable to all motors having reluctance poles both on the stator and the rotor. For example, motors of the kinds disclosed in WO90/02437 and WO92/12567 can have reluctance poles of the stator and/or the rotor designed according to the modified technique.

Increased motor speeds require increased operating frequencies of the current supply for the motor. However, increased operating frequencies are accompanied by increased iron losses. One technique for avoiding the increase of the iron losses consists in using thinner plates for the laminations, but if the plate thickness is reduced it may be difficult or impossible to use automatic production equipment. Another technique consists in reducing or shortening two out of every three plates, but this technique is in most cases unsatisfactory.

It is also an object of the present invention to provide a reluctance pole design which can be adapted for motors operating at elevated frequencies without it being necessary to resort to any of the above-described techniques.

In accordance with this aspect of the invention, the desired reduction of the induction swing at increased operating frequencies is achieved in a reluctance pole of the type shown in FIGS. 1A–1D by providing recesses in those plates which extend up to the air gap, which recesses constrict the cross-sectional area of the plate presented to the magnetic flux in the pole and thereby contribute to a lowering of the flux density for which the pole becomes magnetically saturated at the pole face.

The recesses should be distributed substantially uniformly over the cross-section of the plate. They may take the form of holes, i.e. openings which are not open to the air gap, or they may take the form of openings which communicate with the air gap, preferably via narrow passages. Wide passages are undesirable because they give rise to eddy currents in the faces of the reluctance poles of the other motor part.

In FIGS. 14A and 14B the modification is exemplified for the reluctance poles of the stator of the motor shown in FIGS. 1A–1D, namely the stator reluctance pole 13S to the right in the upper stator pole group. FIG. 14A shows the shortened reluctance pole portion of one plate 11A while FIG. 14B shows the full-length reluctance pole portion of the neighbouring plate 11C. In the region near the air gap 17 this portion is provided with three recesses 11D in the form of elongate openings which have a closed contour and thus are not connected with the curved edge 11E facing the air gap 17. The three recesses are uniformly distributed along the length of the curved edge.

When designing the recessed portion of the plates, the following empirical equation $$\Delta B_2 = \Delta B_1 (f_1/f_2)^{1/1.2}$$

is helpful. In this equation, $\Delta B$ and $f$ represent respectively the induction swing and the operating frequency, the indices 1 and 2 denoting two different operating conditions. As is immediately apparent from the equation, an increased operating frequency with unchanged iron losses calls for a reduction of the induction swing which is less than directly proportional to the increase of the operating frequency. For example, a doubling of the operating frequency requires a reduction of the induction swing to 56% of its previous value for the iron losses to remain unchanged. At elevated operating frequencies it becomes possible to adjust the iron and copper losses so that they become approximately equal which is optimal for torque generation. Consequently, the flux density may be chosen higher than the flux density corresponding to unchanged iron losses.

Although the above-described recessing of the iron plates lowers the saturation flux density at the reluctance pole faces, a substantial increase in air-gap power for the same motor size may be achieved because the motor speed can be increased more than the motor torque must be decreased.

Naturally, the recessing of the reluctance pole portions of the plates in accordance with the principle described above can be applied to motors in which the reluctance pole portions of all plates extend up to the air gap as shown in respect of the plates 11C in FIGS. 1D and 14B. If desired, the recessing may be different for neighbouring plates.

Alternative Embodiments

The following alternative motors are assembled from pole groups with windings and may be shaped for rotary or linear movement.

The rotating motors may have

1. An air-gap surface that is cylindrical, conical, disc-shaped, etc., in principle any shape of surface that a generatrix rotating about a stationary axis can describe.
2. External rotor.
3. The difference between the pole number in the stator and rotor, respectively may be arbitrary, e.g. in the case of segmented stator(s).
4. In a motor with cylindrical air-gap surface and internal rotor, several pole groups may be arranged so that they are connected together by electrical steel laminations in the same plane (as in the embodiments illustrated in the drawings). A motor may consist of several such "motor discs" along a common axis of rotation.

These discs may alternatively be designed without individually closed flux paths and are instead connected by axially directed flux paths. Examples of such an arrangement can be found in WO90/02437. The "motor discs" can be magnetized by common coils for two "motor discs" for example.

5. For motors with axial flux connection between "motor discs", the winding may consist of a cylinder coil surrounding the axis of rotation (an example of such an arrangement is shown in WO90/02437). In this case, for example, the rotating part may contain the pole types which would otherwise have been stationary, and vice versa.
6. Motors in which the stator does not have both reluctance poles as well as permanent-magnet poles, and thus only one pole type, can be modified within the scope of the invention by having the stator poles exchange places with the rotor poles. Examples of such cases are the motors in FIGS. 5A, 5B, 8A, 8B and 10A, 10B. In these motors, thus, the reluctance poles on the stator can be replaced with permanent-magnet poles corresponding to those on the rotor, and the permanent-magnet poles on the rotor can be replaced with reluctance poles corresponding to those on the stator. FIGS. 11A, 11B show such a modification of the motor in FIGS. 8A, 8B.
7. The shape and/or distribution of the poles in a motor, e.g. the reluctance poles, may be chosen so that noise and vibration generated by varying magnetic forces between stator and rotor are reduced as far as possible. Examples of known measures of this type are skewed pole edges or a slightly uneven distribution of the poles along the periphery of the rotor or a certain difference between the pole pitch in a pole group on the stator and the pole pitch on the rotor. Various measures can also be combined.
8. In motors with two, or some other even number of reluctance poles in each group on the stator and no permanent-magnet poles on the stator, the soft-magnetic stator yoke part which in the embodiments shown runs in the middle of the pole group, can be eliminated without affecting the magnetic function of the motor. The mechanical function of said stator yoke parts as spacers may be replaced with non-magnetic spacer means.
9. It will be understood that the coils shown in FIGS. 1 to 12 for magnetizing the pole groups can also be arranged differently, e.g. as coils of transformer type surrounding the yokes between the pole groups, or as shown in FIG.

11A. The stator yoke may also be divided thereby enabling pre-wound coils to be used. It may also be economically advantageous in small motors, for example, to replace two yokes that connect two pole groups together, with a single yoke with doubled cross-sectional are and have a single coil surrounding the yoke. Such arrangements are known in small shaded-pole motors and DC motors.

10. To enable the use of only a single electronic switching element in motors supplied with current pulses of a single polarity, field energy can be returned to the DC source by means of feedback winding wound in parallel with the operating winding, as described in WO90/02437.

What is claimed is:

1. A self-starting brushless electric motor, comprising
    a first motor part (11) having a plurality of pole groups arranged in spaced-apart relation in a first pole line,
    a second motor part (16) having a plurality of poles arranged in spaced-apart relation in a second pole line,
    bearing means supporting the first motor part and the second motor part for relative movement with the first pole line confronting the second pole line across an air gap,
    the first and second pole line comprising a pole system comprising reluctance poles and permanent-magnet poles which are polarized transversely to the air gap, and
    a winding system (15) on the first motor part comprising a winding coil arranged in association with each pole group to produce a magnetic field linking the poles of the first pole line and the second pole line through the pole group upon energization of the coil,
    at least one of the first pole line and the second pole line including a magnetic asymmetry providing a preferential relative direction of movement of the motor parts upon energization of the winding system, at least one of said pole groups comprising an asymmetrical reluctance pole, and wherein
    said at least one pole group of the first pole line includes one symmetrical reluctance pole, one asymmetrical reluctance pole and one symmetrical permanent-magnet pole positioned between the reluctance poles, and in which the second pole line comprises a plurality of substantially evenly spaced identical poles.

2. A motor as claimed in claim 1, in which the second pole line only comprises asymmetrical reluctance poles.

3. A motor as claimed in claim 1, in which the second pole line only comprises asymmetrical permanent-magnet poles of alternating polarities.

4. A motor as claimed in claim 1, in which said at least one pole group of the first pole line includes one symmetrical reluctance pole, one asymmetrical reluctance pole and one asymmetrical permanent-magnet pole positioned between the reluctance poles, and in which the second pole line only comprises evenly spaced permanent-magnet poles of alternating polarities.

5. A motor as claimed in claim 1, in which said at least one pole group of the first pole line includes the two reluctance poles and one symmetrical permanent-magnet pole positioned between the reluctance poles.

6. A motor as claimed in claim 5, in which the second pole line only comprises a plurality of substantially evenly spaced asymmetrical reluctance poles.

7. A motor as claimed in claim 5 in which the pole group of the first pole line includes the two reluctance poles and a permanent-magnet pole positioned between the reluctance poles, and in which the second pole line only comprises a plurality of permanent-magnet poles of alternating polarities.

8. A motor as claimed in claim 1, in which the second pole line comprises a plurality of permanent-magnet poles of alternating polarities, like-polarity poles being substantially evenly spaced.

9. A motor as claimed in claim 8, in which the permanent-magnets of the second pole line are asymmetrical.

10. A self-starting brushless electric motor, comprising
    a first motor part (11) having a plurality of pole groups arranged in spaced-apart relation in a first pole line,
    a second motor part (16) having a plurality of poles arranged in spaced-apart relation in a second pole line,
    bearing means supporting the first motor part and the second motor part for relative movement with the first pole line confronting the second pole line across an air gap,
    the first pole line and the second pole line comprising a pole system comprising reluctance poles and permanent-magnet poles which are polarized transversely to the air gap, and
    a winding system (15) on the first motor part comprising a winding coil arranged in association with each pole group to produce a magnetic field linking the poles of the first pole line and the second pole line through the pole group upon energization of the coil,
    at least one of the first pole line and the second pole line including a magnetic asymmetry providing a preferential relative direction of movement of the motor parts upon energization of the winding system, at least one of said pole groups comprising an asymmetrical permanent-magnet pole;
    in which said at least one pole group of the first pole line includes at least one symmetrical reluctance pole; and
    in which said at least one pole group of the first pole line includes one symmetrical reluctance pole, one asymmetrical reluctance pole and one asymmetrical permanent-magnet pole positioned between the reluctance poles, and in which the second pole line comprises a plurality of substantially evenly spaced asymmetrical identical poles.

11. A motor according to claim 10, in which the asymmetrical permanent-magnet poles on the first motor part and on the second motor part comprise a main pole part and an auxiliary pole part which projects from the main pole part in the preferential relative direction of the movement of the respective motor part.

12. A motor according to claim 11, in which the auxiliary pole parts are of a length, as measured along pole lines, such that when any two poles on the two motor parts are magnetically aligned with one another, the auxiliary pole part of at least one of the magnetically asymmetrical poles on one of the motor parts extends to a vicinity of an adjacent pole on the other motor part.

13. A motor according to claim 12, wherein the auxiliary pole part of the at least one of the magnetically asymmetrical poles on one of the motor parts slightly overlaps said adjacent pole.

14. A motor as claimed in claim 11, in which the pole groups of the first pole line are identical.

15. A motor according to claim 11, in which the motor is a rotary motor and in which the first pole line comprises at least one pair of diametrically opposite pole groups.

16. A self-starting brushless electric motor, comprising
    a first motor part (11) having a plurality of pole groups arranged in spaced-apart relation in a first pole line, a second motor part (16) having a plurality of poles arranged in spaced-apart relation in a second pole line, bearing means supporting the first motor part and the second motor part for relative movement with the first pole line confronting the second pole line across an air gap, the first pole line and the second pole line comprising a pole system comprising reluctance poles and permanent-magnet poles which are polarized transversely to the air gap, a winding system (15) on the first motor part comprising a winding coil arranged in association with each pole group to produce a magnetic field linking the poles of the first pole line and the second pole line through the pole group upon energization fo the coil, a direction of said magnetic field being opposite to a direction of magnetization of the permanent magnets, at least one of the first pole line and the second pole line including a magnetic asymmetry providing a preferential relative direction of movement of the motor parts upon energization of the winding system, at least one of said pole groups comprising a pair of reluctance poles and an asymmetrical permanent-magnet pole positioned between and spaced from said reluctance poles; and wherein the second pole, line includes at least one asymmetrical reluctance pole said at least one pole group of the first pole line includes two symmetrical reluctance poles, the permanent-magnet pole being positioned between the reluctance poles, and in which the second pole line comprises a plurality of substantially evenly spaced asymmetrical identical poles;

asymmetrical poles on the first motor part and on the second motor part comprise a main pole part and an auxiliary pole part which projects from the main pole part;

the auxiliary pole parts are of a length, as measured along pole lines, such that when any two poles on the two motor parts are magnetically aligned with one another, the auxiliary pole part of at least one of the magnetically asymmetrical poles on one of the motor parts extends at least to the vicinity of an adjacent pole on the other motor part and preferably slightly overlaps said adjacent pole; and the auxiliary pole part of at least one of the magnetically asymmetrical poles on one of the motor parts slightly overlaps said adjacent pole.

17. A motor as claimed in claim 16, in which said at least one pole group of the first pole line includes at least one symmetrical reluctance pole.

18. A self-starting brushless electric motor, comprising a first motor part (11) having a plurality of pole groups arranged in spaced-apart relation in a first pole line, a second motor part (16) having a plurality of poles arranged in spaced-apart relation in a second pole line, bearing means supporting the first motor part and the second motor part for relative movement with the first pole line confronting the second pole line across an air gap, the first pole line and the second pole line comprising a pole system comprising reluctance poles and permanent-magnet poles which are polarized transversely to the air gap, and a winding system (15) on the first motor part comprising a winding coil arranged in association with each pole group to produce a magnetic field linking the poles of the first pole line and the second pole line through the pole group upon energization of the coil, at least one of the first pole line and the second pole line including a magnetic asymmetry providing a preferential relative direction of movement of the motor parts upon energization of the winding system, at least one of said pole groups comprising an asymmetrical permanent-magnet pole;

in which said at least one pole group of the first pole line includes at least one symmetrical reluctance pole; and in which said at least one pole group of the first pole line includes one symmetrical reluctance pole, one asymmetrical reluctance pole and one asymmetrical permanent-magnet pole positioned between the reluctance poles, and in which the second pole line includes a plurality of substantially evenly spaced symmetrical permanent-magnet poles.

19. A self-starting brushless electric motor, comprising a first motor part (11) having a plurality of pole groups arranged in spaced-apart relation in a first pole line, a second motor part (16) having a plurality of poles arranged in spaced-apart relation in a second pole line.

bearing means supporting the first motor part and the second motor part for relative movement with the first pole line confronting the second pole line across an air gap, the first pole line and the second pole line comprising a pole system comprising reluctance poles and permanent-magnet poles which are polarized transversely to the air gap, and a winding system (15) on the first motor part comprising a winding coil arranged in association with each pole group to produce a magnetic field linking the poles of the first pole line and the second pole line through the pole group upon energization of the coil, at least one of the first pole line and the second pole line including a magnetic asymmetry providing a preferential relative direction of movement of the motor parts upon energization of the winding system, at least one of said pole groups comprising an asymmetrical permanent-magnet pole;

in which said at least one pole group of the first pole line comprises a permanent-magnet pole which is placed in an asymmetrical position, and the second pole line comprises a plurality of substantially evenly spaced asymmetrical reluctance poles;

in which said at least one pole group comprises a pair of reluctance poles, the permanent-magnet pole being placed between the reluctance poles in a position which is asymmetrical with respect to them; and in which the permanent-magnet pole and the reluctance poles are symmetrical, in which the permanent-magnet pole is displaceable along the pole line from said asymmetrical position to a corresponding asymmetrical position on the opposite side of a line of symmetry between the reluctance poles and in which the reluctance poles of the second pole line comprise a main pole part and an auxiliary pole part at each end of the main pole part.

* * * * *